(12) United States Patent
Penilla et al.

(10) Patent No.: US 9,718,370 B2
(45) Date of Patent: *Aug. 1, 2017

(54) METHODS AND SYSTEMS FOR ELECTRIC VEHICLE (EV) CHARGING AND CLOUD REMOTE ACCESS AND USER NOTIFICATIONS

(71) Applicants: Angel A. Penilla, Sacramento, CA (US); Albert S. Penilla, Sunnyvale, CA (US)

(72) Inventors: Angel A. Penilla, Sacramento, CA (US); Albert S. Penilla, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,016

(22) Filed: Sep. 6, 2016

(65) Prior Publication Data

US 2016/0375780 A1    Dec. 29, 2016

Related U.S. Application Data

(63) Continuation of application No. 15/161,373, filed on May 23, 2016, now Pat. No. 9,434,270, which is a
(Continued)

(51) Int. Cl.
*H02J 7/00* (2006.01)
*B60L 11/18* (2006.01)
(Continued)

(52) U.S. Cl.
CPC ............ *B60L 11/1824* (2013.01); *B60L 1/00* (2013.01); *B60L 11/18* (2013.01); *B60L 11/1816* (2013.01); *B60L 11/1822* (2013.01); *B60L 11/1838* (2013.01); *B60L 11/1844* (2013.01); *B60L 11/1848* (2013.01); *B60L 11/1861* (2013.01); *G06Q 10/02* (2013.01); *G06Q 10/20* (2013.01); *G06Q 20/18* (2013.01); *G06Q 30/00* (2013.01); *G06Q 30/0265* (2013.01); *G06Q 30/0643* (2013.01); *G06Q 30/0645* (2013.01); *G06Q 50/06* (2013.01); *G07F 15/005* (2013.01); *H02J 7/0027* (2013.01); *H04W 4/02* (2013.01); *H04W 4/021* (2013.01); *B60L 2230/16* (2013.01); *B60L 2240/547* (2013.01); *G01C 21/3679* (2013.01); *H02J 2007/0096* (2013.01);
(Continued)

(58) Field of Classification Search
CPC ...................................... Y02T 90/14
USPC ............ 320/109, 107, 104; 180/65.1, 65.21; 307/10.1
See application file for complete search history.

(56) References Cited

U.S. PATENT DOCUMENTS 3,690,397 A    9/1972  Parker
3,799,063 A    3/1974  Reed
(Continued)

*Primary Examiner* — Yalkew Fantu

(57) ABSTRACT

Systems and methods for charging an electric battery of a vehicle are provided. The vehicle includes a battery for powering an electric motor of the vehicle. A controller of the vehicle is provided to interface with a battery and to enable control of charging of the battery. The vehicle includes a communications interface for enabling wireless communication with a server, and the server is configured to manage a plurality of user accounts for users. The server is one of a plurality of servers, and the servers providing access to cloud services regarding vehicle use and metrics.

20 Claims, 8 Drawing Sheets

Related U.S. Application Data continuation of application No. 13/937,202, filed on Jul. 8, 2013, now Pat. No. 9,346,365, which is a continuation-in-part of application No. 13/452,882, filed on Apr. 22, 2012, now Pat. No. 9,123,035.

(60) Provisional application No. 61/763,453, filed on Feb. 11, 2013, provisional application No. 61/757,020, filed on Jan. 25, 2013, provisional application No. 61/760,003, filed on Feb. 1, 2013, provisional application No. 61/745,729, filed on Dec. 24, 2012, provisional application No. 61/478,436, filed on Apr. 22, 2011.

(51) Int. Cl.
| | | |
|---|---|---|
| *G06Q 30/02* | (2012.01) | |
| *G06Q 10/02* | (2012.01) | |
| *G06Q 10/00* | (2012.01) | |
| *G06Q 20/18* | (2012.01) | |
| *G06Q 30/00* | (2012.01) | |
| *G06Q 30/06* | (2012.01) | |
| *G06Q 50/06* | (2012.01) | |
| *G07F 15/00* | (2006.01) | |
| *H04W 4/02* | (2009.01) | |
| *B60L 1/00* | (2006.01) | |
| *G01C 21/36* | (2006.01) | |
| *H04W 4/20* | (2009.01) | |

(52) U.S. Cl.
CPC ............ *H04W 4/206* (2013.01); *Y02T 10/705* (2013.01); *Y02T 10/7005* (2013.01); *Y02T 10/7044* (2013.01); *Y02T 10/7072* (2013.01); *Y02T 90/124* (2013.01); *Y02T 90/128* (2013.01); *Y02T 90/14* (2013.01); *Y02T 90/16* (2013.01); *Y02T 90/161* (2013.01)

(56) References Cited

U.S. PATENT DOCUMENTS

| | | | |
|---|---|---|---|
| 3,867,682 A | 2/1975 | Ohya | |
| 4,052,655 A | 10/1977 | Vizza | |
| 4,102,273 A | 7/1978 | Merkle et al. | |
| 4,132,174 A | 1/1979 | Ziegenfus et al. | |
| 4,162,445 A | 7/1979 | Campbell | |
| 4,309,644 A | 1/1982 | Reimers | |
| 4,347,472 A | 8/1982 | Lemelson | |
| 4,383,210 A | 5/1983 | Wilkinson | |
| 4,389,608 A | 6/1983 | Dahl et al. | |
| 4,405,891 A | 9/1983 | Galloway | |
| 4,433,278 A | 2/1984 | Lowndes et al. | |
| 4,450,400 A | 5/1984 | Gwyn | |
| 4,532,418 A | 7/1985 | Meese | |
| 4,789,047 A | 12/1988 | Knobloch | |
| 4,815,840 A | 3/1989 | Benayad-Cherif et al. | |
| 5,049,802 A | 9/1991 | Mintus et al. | |
| 5,121,112 A | 6/1992 | Nakadozono | |
| 5,132,666 A | 7/1992 | Fahs | |
| 5,184,058 A | 2/1993 | Hesse | |
| 5,202,617 A | 4/1993 | Nor | |
| 5,297,664 A | 3/1994 | Tseng et al. | |
| 5,306,999 A | 4/1994 | Hoffman | |
| 5,315,227 A | 5/1994 | Pierson | |
| 5,327,066 A | 7/1994 | Smith | |
| 5,343,970 A | 9/1994 | Severinsky | |
| 5,422,624 A | 6/1995 | Smith | |
| 5,434,781 A | 7/1995 | Alofs | |
| 5,441,122 A | 8/1995 | Yoshida | |
| 5,449,995 A | 9/1995 | Kohchi | |
| 5,487,002 A | 1/1996 | Diler et al. | |
| 5,488,283 A | 1/1996 | Dougher et al. | |
| 5,492,190 A | 2/1996 | Yoshida | |
| 5,548,200 A * | 8/1996 | Nor et al. ............. | 320/109 |
| 5,549,443 A | 8/1996 | Hammerslag | |
| 5,555,502 A | 9/1996 | Opel | |
| 5,563,491 A | 10/1996 | Tseng | |
| 5,585,205 A | 12/1996 | Kohchi | |
| 5,594,318 A | 1/1997 | Knor | |
| 5,595,271 A | 1/1997 | Tseng | |
| 5,596,258 A | 1/1997 | Kimura et al. | |
| 5,612,606 A | 3/1997 | Guimarin et al. | |
| 5,627,752 A | 5/1997 | Buck et al. | |
| 5,636,145 A | 6/1997 | Gorman et al. | |
| 5,642,270 A | 6/1997 | Green et al. | |
| 5,666,102 A | 9/1997 | Lahiff | |
| 5,691,695 A | 11/1997 | Lahiff | |
| 5,694,019 A | 12/1997 | Uchida et al. | |
| 5,701,706 A | 12/1997 | Kreysler et al. | |
| 5,736,833 A | 4/1998 | Farris | |
| 5,760,569 A | 6/1998 | Chase, Jr. | |
| 5,778,326 A | 7/1998 | Moroto et al. | |
| 5,790,976 A | 8/1998 | Boll et al. | |
| 5,892,598 A | 4/1999 | Asakawa et al. | |
| 5,916,285 A | 6/1999 | Alofs et al. | |
| 5,974,136 A | 10/1999 | Murai | |
| 5,998,963 A | 12/1999 | Aarseth | |
| 6,014,597 A | 1/2000 | Kochanneck | |
| 6,049,745 A | 4/2000 | Douglas et al. | |
| 6,067,008 A | 5/2000 | Smith | |
| 6,081,205 A | 6/2000 | Williams | |
| 6,085,131 A | 7/2000 | Kim | |
| 6,151,539 A | 11/2000 | Bergholz et al. | |
| 6,175,789 B1 | 1/2001 | Beckert et al. | |
| 6,225,776 B1 | 5/2001 | Chai | |
| 6,234,932 B1 | 5/2001 | Kuroda et al. | |
| 6,236,333 B1 | 5/2001 | King | |
| 6,252,380 B1 | 6/2001 | Koenck | |
| 6,301,531 B1 | 10/2001 | Pierro | |
| 6,307,349 B1 | 10/2001 | Koenck et al. | |
| 6,330,497 B1 | 12/2001 | Obradovich et al. | |
| 6,330,499 B1 | 12/2001 | Chou et al. | |
| 6,370,475 B1 | 4/2002 | Breed et al. | |
| 6,373,380 B1 | 4/2002 | Robertson et al. | |
| 6,416,209 B1 | 7/2002 | Abbott | |
| 6,434,465 B2 | 8/2002 | Schmitt et al. | |
| 6,456,041 B1 | 9/2002 | Terada et al. | |
| 6,466,658 B2 | 10/2002 | Schelberg, Jr. et al. | |
| 6,480,767 B2 | 11/2002 | Yamaguchi | |
| 6,487,477 B1 | 11/2002 | Woestmanm et al. | |
| 6,498,454 B1 | 12/2002 | Pinlam | |
| 6,511,192 B1 | 1/2003 | Henion | |
| 6,586,866 B1 | 7/2003 | Ikedo | |
| 6,614,204 B2 | 9/2003 | Pellegrino et al. | |
| 6,629,024 B2 | 9/2003 | Tabata | |
| 6,727,809 B1 | 4/2004 | Smith | |
| 6,741,036 B1 | 5/2004 | Ikedo | |
| 6,765,495 B1 | 7/2004 | Dunning et al. | |
| 6,789,733 B2 | 9/2004 | Terranova | |
| 6,794,849 B2 | 9/2004 | Mori et al. | |
| 6,850,898 B1 | 2/2005 | Murakami | |
| 6,915,869 B2 | 7/2005 | Botti | |
| 6,922,629 B2 | 7/2005 | Yoshikawa et al. | |
| 6,937,140 B1 | 8/2005 | Outslay | |
| 6,940,254 B2 * | 9/2005 | Nagamine et al. ........... | 320/109 |
| 7,013,205 B1 | 3/2006 | Hafner | |
| 7,039,389 B2 | 5/2006 | Johnson, Jr. | |
| 7,084,781 B2 | 8/2006 | Chuey | |
| 7,201,384 B2 | 4/2007 | Chaney | |
| 7,269,416 B2 | 9/2007 | Guthrie et al. | |
| 7,289,611 B2 | 10/2007 | Iggulden | |
| 7,376,497 B2 | 5/2008 | Chen | |
| 7,379,541 B2 | 5/2008 | Iggulden et al. | |
| 7,402,978 B2 | 7/2008 | Pryor | |
| 7,489,993 B2 * | 2/2009 | Coffee et al. ................ | 701/32.3 |
| 7,532,965 B2 | 5/2009 | Robillard | |
| 7,565,396 B2 | 7/2009 | Hoshina | |
| 7,630,802 B2 | 12/2009 | Breed | |
| 7,650,210 B2 | 1/2010 | Breed | |
| 7,674,536 B2 | 3/2010 | Chipchase | |
| 7,683,771 B1 | 3/2010 | Loeb | |
| 7,693,609 B2 | 4/2010 | Kressner et al. | |
| 7,698,078 B2 | 4/2010 | Kelty et al. | |

(56) References Cited

U.S. PATENT DOCUMENTS

| | | |
|---|---|---|
| 7,740,092 B2 | 6/2010 | Bender |
| 7,751,945 B2 | 7/2010 | Obata |
| 7,778,746 B2 | 8/2010 | McLeod |
| 7,796,052 B2 | 9/2010 | Katz |
| 7,850,351 B2 | 12/2010 | Pastrick et al. |
| 7,869,576 B1 | 1/2011 | Rodkey et al. |
| 7,885,893 B2 | 2/2011 | Alexander |
| 7,949,435 B2 | 5/2011 | Pollack |
| 7,956,570 B2 | 6/2011 | Lowenthal |
| 7,979,198 B1 | 7/2011 | Kim et al. |
| 7,986,126 B1 | 7/2011 | Bucci |
| 7,991,665 B2 | 8/2011 | Hafner |
| 8,006,793 B2 | 8/2011 | Heichal et al. |
| 8,027,843 B2 | 9/2011 | Bodin et al. |
| 8,036,788 B2 | 10/2011 | Breed |
| 8,054,048 B2 | 11/2011 | Woody |
| 8,072,318 B2 | 12/2011 | Lynam |
| 8,103,391 B2 | 1/2012 | Ferro et al. |
| 8,253,281 B2 | 8/2012 | Namuduri et al. |
| 8,256,553 B2 | 9/2012 | De Paschoal |
| 8,262,268 B2 | 9/2012 | Pastrick et al. |
| 8,265,816 B1 | 9/2012 | LaFrance |
| 8,266,075 B2 | 9/2012 | Ambrosio et al. |
| 8,294,420 B2 | 10/2012 | Kocher |
| 8,333,492 B2 | 12/2012 | Dingman et al. |
| 8,336,664 B2 | 12/2012 | Wallace et al. |
| 8,350,526 B2 | 1/2013 | Dyer et al. |
| 8,366,371 B2 | 2/2013 | Maniscalco et al. |
| 8,392,065 B2 | 3/2013 | Tolstedt |
| 8,405,347 B2 | 3/2013 | Gale |
| 8,482,255 B2 | 7/2013 | Crombez |
| 8,483,775 B2 | 7/2013 | Buck et al. |
| 8,483,907 B2 | 7/2013 | Tarte |
| 8,490,005 B2 | 7/2013 | Tarte |
| 8,508,188 B2 | 8/2013 | Murtha et al. |
| 8,521,599 B2 | 8/2013 | Rivers, Jr. et al. |
| 8,527,135 B2 | 9/2013 | Lowrey et al. |
| 8,527,146 B1 | 9/2013 | Jackson |
| 8,552,686 B2 | 10/2013 | Jung |
| 8,589,019 B2 | 11/2013 | Wallace et al. |
| 8,624,719 B2 | 1/2014 | Klose |
| 8,630,741 B1 | 1/2014 | Matsuoka et al. |
| 8,635,091 B2 | 1/2014 | Amigo |
| 8,643,329 B2 | 2/2014 | Prosser et al. |
| 8,660,734 B2 | 2/2014 | Zhu et al. |
| 8,686,864 B2 | 4/2014 | Hannon |
| 8,694,328 B1 | 4/2014 | Gormley |
| 8,706,394 B2 | 4/2014 | Trepagnier et al. |
| 8,713,121 B1 | 4/2014 | Bain |
| 8,717,170 B1 | 5/2014 | Juhasz |
| 8,725,551 B2 | 5/2014 | Ambrosio et al. |
| 8,751,065 B1 | 6/2014 | Kato |
| 8,751,271 B2 | 6/2014 | Stefik et al. |
| 8,760,432 B2 | 6/2014 | Jira et al. |
| 8,799,037 B2 | 8/2014 | Stefik et al. |
| 8,816,845 B2 | 8/2014 | Hoover et al. |
| 8,818,622 B2 | 8/2014 | Bergholz et al. |
| 8,818,725 B2 | 8/2014 | Ricci |
| 8,819,414 B2 | 8/2014 | Bellur et al. |
| 8,825,222 B2 | 9/2014 | Namburu et al. |
| 8,836,281 B2 | 9/2014 | Ambrosio et al. |
| 2002/0064258 A1 | 5/2002 | Schelberg et al. |
| 2002/0085043 A1 | 7/2002 | Ribak |
| 2002/0133273 A1 | 9/2002 | Lowrey et al. |
| 2003/0137277 A1 | 7/2003 | Mori et al. |
| 2003/0153278 A1 | 8/2003 | Johnson |
| 2003/0205619 A1 | 11/2003 | Terranova et al. |
| 2003/0209375 A1* | 11/2003 | Suzuki et al. ............... 180/65.3 |
| 2003/0234325 A1 | 12/2003 | Marino et al. |
| 2004/0046506 A1 | 3/2004 | Mawai et al. |
| 2004/0064235 A1 | 4/2004 | Cole |
| 2004/0092253 A1 | 5/2004 | Simonds et al. |
| 2004/0093155 A1 | 5/2004 | Simonds et al. |
| 2004/0265671 A1 | 12/2004 | Chipchase et al. |
| 2005/0021190 A1 | 1/2005 | Worrell et al. |
| 2005/0035741 A1* | 2/2005 | Elder et al. ................... 320/116 |
| 2005/0044245 A1 | 2/2005 | Hoshina |
| 2005/0231119 A1 | 10/2005 | Ito et al. |
| 2006/0125620 A1 | 6/2006 | Smith et al. |
| 2006/0182241 A1 | 8/2006 | Schelberg |
| 2006/0282381 A1 | 12/2006 | Ritchie |
| 2006/0287783 A1 | 12/2006 | Walker |
| 2007/0068714 A1 | 3/2007 | Bender |
| 2007/0126395 A1 | 6/2007 | Suchar |
| 2007/0282495 A1 | 12/2007 | Kempton |
| 2008/0039979 A1 | 2/2008 | Bridges et al. |
| 2008/0039989 A1 | 2/2008 | Pollack et al. |
| 2008/0040129 A1 | 2/2008 | Cauwels et al. |
| 2008/0040223 A1 | 2/2008 | Bridges et al. |
| 2008/0040295 A1 | 2/2008 | Kaplan et al. |
| 2008/0052145 A1 | 2/2008 | Kaplan et al. |
| 2008/0086411 A1 | 4/2008 | Olsen et al. |
| 2008/0097904 A1 | 4/2008 | Volchek |
| 2008/0155008 A1 | 6/2008 | Stiles et al. |
| 2008/0180027 A1 | 7/2008 | Matsushita et al. |
| 2008/0203973 A1 | 8/2008 | Gale et al. |
| 2008/0228613 A1 | 9/2008 | Alexander |
| 2008/0281663 A1 | 11/2008 | Hakim |
| 2008/0294283 A1 | 11/2008 | Ligrano |
| 2008/0312782 A1 | 12/2008 | Berdichevsky |
| 2009/0011639 A1 | 1/2009 | Ballard et al. |
| 2009/0021213 A1 | 1/2009 | Johnson |
| 2009/0021385 A1 | 1/2009 | Kelty et al. |
| 2009/0030712 A1 | 1/2009 | Bogolea |
| 2009/0043519 A1 | 2/2009 | Bridges et al. |
| 2009/0058355 A1 | 3/2009 | Meyer |
| 2009/0066287 A1 | 3/2009 | Pollack et al. |
| 2009/0076913 A1 | 3/2009 | Morgan |
| 2009/0082957 A1 | 3/2009 | Agassi et al. |
| 2009/0091291 A1 | 4/2009 | Woody et al. |
| 2009/0092864 A1 | 4/2009 | McLean |
| 2009/0144001 A1 | 6/2009 | Leonard et al. |
| 2009/0157289 A1 | 6/2009 | Graessley |
| 2009/0164473 A1 | 6/2009 | Bauer |
| 2009/0174365 A1 | 7/2009 | Lowenthal et al. |
| 2009/0177580 A1 | 7/2009 | Lowenthal et al. |
| 2009/0210357 A1 | 8/2009 | Pudar et al. |
| 2009/0287578 A1 | 11/2009 | Paluszek |
| 2009/0304101 A1* | 12/2009 | LoPorto et al. ............... 375/260 |
| 2009/0312903 A1 | 12/2009 | Hafner et al. |
| 2009/0313032 A1 | 12/2009 | Hafner et al. |
| 2009/0313033 A1 | 12/2009 | Hafner et al. |
| 2009/0313034 A1 | 12/2009 | Ferro et al. |
| 2009/0313098 A1 | 12/2009 | Hafner et al. |
| 2009/0313104 A1 | 12/2009 | Hafner et al. |
| 2009/0313174 A1 | 12/2009 | Hafner et al. |
| 2010/0013434 A1 | 1/2010 | Taylor-Haw et al. |
| 2010/0017045 A1 | 1/2010 | Nesler et al. |
| 2010/0017249 A1 | 1/2010 | Fincham et al. |
| 2010/0049396 A1 | 2/2010 | Ferro et al. |
| 2010/0049533 A1 | 2/2010 | Ferro et al. |
| 2010/0049610 A1 | 2/2010 | Ambrosio et al. |
| 2010/0049639 A1 | 2/2010 | Ferro et al. |
| 2010/0049737 A1 | 2/2010 | Ambrosio et al. |
| 2010/0052475 A1 | 3/2010 | Lee |
| 2010/0057306 A1 | 3/2010 | Ishii et al. |
| 2010/0112843 A1 | 5/2010 | Heichai et al. |
| 2010/0141206 A1 | 6/2010 | Agassi et al. |
| 2010/0161481 A1 | 6/2010 | Littrell |
| 2010/0161482 A1 | 6/2010 | Littrell |
| 2010/0169008 A1 | 7/2010 | Niwa et al. |
| 2010/0198508 A1 | 8/2010 | Tang |
| 2010/0198513 A1 | 8/2010 | Zeng |
| 2010/0211340 A1 | 8/2010 | Lowenthal et al. |
| 2010/0211643 A1 | 8/2010 | Lowenthal et al. |
| 2010/0222939 A1 | 9/2010 | Namburu |
| 2010/0268426 A1 | 10/2010 | Pathak |
| 2010/0280956 A1 | 11/2010 | Chutorash et al. |
| 2010/0304349 A1 | 12/2010 | Kunin |
| 2011/0032110 A1 | 2/2011 | Taguchi |
| 2011/0074350 A1 | 3/2011 | Kocher |
| 2011/0074351 A1 | 3/2011 | Bianco et al. |
| 2011/0077809 A1 | 3/2011 | Leary |
| 2011/0106329 A1 | 5/2011 | Donnelly et al. |

(56) References Cited

U.S. PATENT DOCUMENTS

| | | |
|---|---|---|
| 2011/0112969 A1 | 5/2011 | Zaid et al. |
| 2011/0130885 A1 | 6/2011 | Bowen et al. |
| 2011/0187521 A1 | 8/2011 | Beruscha et al. |
| 2011/0191265 A1 | 8/2011 | Lowenthal et al. |
| 2011/0193522 A1 | 8/2011 | Uesugi |
| 2011/0202218 A1 | 8/2011 | Yano |
| 2011/0246252 A1 | 10/2011 | Uesugi |
| 2011/0279083 A1 | 11/2011 | Asai |
| 2011/0309929 A1 | 12/2011 | Myers |
| 2012/0013300 A1 | 1/2012 | Prosser et al. |
| 2012/0019204 A1 | 1/2012 | Matsuo |
| 2012/0025765 A1 | 2/2012 | Frey et al. |
| 2012/0028680 A1 | 2/2012 | Breed |
| 2012/0041624 A1 | 2/2012 | Stewart et al. |
| 2012/0053754 A1 | 3/2012 | Pease |
| 2012/0074903 A1 | 3/2012 | Nakashima |
| 2012/0105197 A1 | 5/2012 | Kobres |
| 2012/0123670 A1 | 5/2012 | Uyeki |
| 2012/0136743 A1 | 5/2012 | McQuade et al. |
| 2012/0136802 A1 | 5/2012 | McQuade et al. |
| 2012/0158244 A1 | 6/2012 | Talty et al. |
| 2012/0179323 A1 | 7/2012 | Profitt-Brown et al. |
| 2012/0218128 A1 | 8/2012 | Tieman et al. |
| 2012/0229056 A1 | 9/2012 | Bergfjord |
| 2012/0229085 A1 | 9/2012 | Lau |
| 2012/0232965 A1 | 9/2012 | Rodriguez et al. |
| 2012/0233077 A1 | 9/2012 | Tate et al. |
| 2012/0262002 A1 | 10/2012 | Widmer et al. |
| 2012/0268068 A1 | 10/2012 | Jung et al. |
| 2012/0268076 A1 | 10/2012 | Danner |
| 2012/0268242 A1 | 10/2012 | Tieman et al. |
| 2012/0280654 A1 | 11/2012 | Kim |
| 2012/0296512 A1 | 11/2012 | Lee et al. |
| 2012/0303397 A1 | 11/2012 | Prosser |
| 2012/0306445 A1 | 12/2012 | Park et al. |
| 2012/0310713 A1 | 12/2012 | Mercuri et al. |
| 2012/0316671 A1 | 12/2012 | Hammerslag et al. |
| 2013/0002876 A1 | 1/2013 | Pastrick et al. |
| 2013/0020139 A1 | 1/2013 | Kim et al. |
| 2013/0021162 A1 | 1/2013 | DeBoer et al. |
| 2013/0037339 A1 | 2/2013 | Hickox |
| 2013/0099892 A1 | 4/2013 | Tucker et al. |
| 2013/0103236 A1 | 4/2013 | Mehrgan |
| 2013/0110296 A1 | 5/2013 | Khoo et al. |
| 2013/0110632 A1 | 5/2013 | Theurer et al. |
| 2013/0110653 A1 | 5/2013 | Rivers et al. |
| 2013/0127247 A1 | 5/2013 | Oh et al. |
| 2013/0135093 A1 | 5/2013 | Araki |
| 2013/0144520 A1 | 6/2013 | Ricci |
| 2013/0145065 A1 | 6/2013 | Ricci |
| 2013/0179057 A1 | 7/2013 | Fisher et al. |
| 2013/0204466 A1 | 8/2013 | Ricci |
| 2013/0241720 A1 | 9/2013 | Ricci et al. |
| 2013/0253746 A1 | 9/2013 | Choi et al. |
| 2013/0280018 A1 | 10/2013 | Meirer et al. |
| 2013/0300554 A1 | 11/2013 | Braden |
| 2013/0317693 A1 | 11/2013 | Jefferies et al. |
| 2013/0317694 A1 | 11/2013 | Merg et al. |
| 2013/0328387 A1 | 12/2013 | Venkateswaran |
| 2013/0338820 A1 | 12/2013 | Corbett et al. |
| 2013/0342363 A1 | 12/2013 | Paek et al. |
| 2014/0002015 A1 | 1/2014 | Tripathi et al. |
| 2014/0019280 A1 | 1/2014 | Medeiros et al. |
| 2014/0021908 A1 | 1/2014 | McCool |
| 2014/0028255 A1* | 1/2014 | Brimacombe ............... 320/109 |
| 2014/0042968 A1 | 2/2014 | Hiroe |
| 2014/0047107 A1 | 2/2014 | Maturana et al. |
| 2014/0066049 A1 | 3/2014 | Cho et al. |
| 2014/0089016 A1 | 3/2014 | Smullin et al. |
| 2014/0106726 A1 | 4/2014 | Crosbie |
| 2014/0118107 A1 | 5/2014 | Almomani |
| 2014/0120829 A1 | 5/2014 | Bhamidipati et al. |
| 2014/0125355 A1 | 5/2014 | Grant |
| 2014/0142783 A1 | 5/2014 | Grimm et al. |
| 2014/0163771 A1 | 6/2014 | Demeniuk |
| 2014/0163774 A1 | 6/2014 | Demeniuk |
| 2014/0164559 A1 | 6/2014 | Demeniuk |
| 2014/0172192 A1 | 6/2014 | Kato |
| 2014/0172265 A1 | 6/2014 | Funabashi |
| 2014/0172727 A1 | 6/2014 | Abhyanker et al. |
| 2014/0179353 A1 | 6/2014 | Simon |
| 2014/0200742 A1 | 7/2014 | Mauti et al. |
| 2014/0203077 A1 | 7/2014 | Gadh et al. |
| 2014/0207333 A1 | 7/2014 | Vandivier et al. |
| 2014/0214261 A1 | 7/2014 | Ramamoorthy et al. |
| 2014/0214321 A1 | 7/2014 | Kawamata et al. |
| 2014/0218189 A1 | 8/2014 | Fleming et al. |
| 2014/0232331 A1 | 8/2014 | Stamenic et al. |
| 2014/0236414 A1 | 8/2014 | Droz et al. |
| 2014/0236463 A1 | 8/2014 | Zhang et al. |
| 2014/0253018 A1 | 9/2014 | Kong et al. |
| 2014/0277936 A1 | 9/2014 | El Dokor et al. |
| 2014/0278089 A1 | 9/2014 | Gusikhin et al. |
| 2014/0300739 A1 | 10/2014 | Mimar |

\* cited by examiner

METHODS AND SYSTEMS FOR ELECTRIC VEHICLE (EV) CHARGING AND CLOUD REMOTE ACCESS AND USER NOTIFICATIONS

CLAIM OF PRIORITY

This is a continuation application of U.S. patent application Ser. No. 15/161,373, filed on May 23, 2016, entitled "METHODS AND SYSTEMS FOR ELECTRIC VEHICLE (EV) CHARGING, CHARGING UNIT (CU) INTERFACES, AUXILIARY BATTERIES, AND REMOTE ACCESS AND USER NOTIFICATIONS," which is a continuation application of U.S. patent application Ser. No. 13/937,202, filed on Jul. 8, 2013, entitled "METHODS AND SYSTEMS FOR ELECTRIC VEHICLE (EV) CHARGING, CHARGING UNIT (CU) INTERFACES, AUXILIARY BATTERIES, AND REMOTE ACCESS AND USER NOTIFICATIONS," which claims priority to: (1) U.S. Provisional Patent Application No. 61/763,453, filed on Feb. 11, 2013, and entitled "METHODS AND SYSTEMS FOR ELECTRIC VEHICLE (EV) CHARGING, CHARGING UNIT (CU) INTERFACES, AUXILIARY BATTERIES, AND REMOTE ACCESS AND USER NOTIFICATIONS," (2) U.S. Provisional Patent Application No. 61/757,020, filed on Jan. 25, 2013, and entitled "METHODS AND SYSTEMS FOR CLOUD-BASED DATA EXCHANGES FOR REMOTE VEHICLE CONTROL AND DATA SHARING, COMMUNICATION FOR AUTOMATIC DRIVERLESS MOVEMENT, ACCIDENT AVOIDANCE CONTROL AND NOTIFICATIONS," (3) U.S. Provisional Patent Application No. 61/760,003, filed on Feb. 1, 2013, and entitled "METHODS AND SYSTEMS FOR VEHICLE SECURITY AND REMOTE ACCESS AND SAFETY CONTROL INTERFACES AND NOTIFICATIONS", which is herein incorporated by reference, and (4) U.S. Provisional Patent Application No. 61/745,729, filed on Dec. 24, 2012, and entitled "METHODS AND SYSTEMS FOR ELECTRIC VEHICLE (EV) CHARGING, CHARGING SYSTEMS, INTERNET APPLICATIONS AND USER NOTIFICATIONS", which are all herein incorporated by reference.

U.S. patent application Ser. No. 13/937,202, filed on Jul. 8, 2016, entitled "METHODS AND SYSTEMS FOR ELECTRIC VEHICLE (EV) CHARGING, CHARGING UNIT (CU) INTERFACES, AUXILIARY BATTERIES, AND REMOTE ACCESS AND USER NOTIFICATIONS," also claims priority as a continuation-in-part of U.S. application Ser. No. 13/452,882, filed Apr. 22, 2012, and entitled "ELECTRIC VEHICLE (EV) RANGE EXTENDING CHARGE SYSTEMS, DISTRIBUTED NETWORKS OF CHARGE KIOSKS, AND CHARGE LOCATING MOBILE APPS", which claims priority to U.S. Provisional Application No. 61/478,436, filed on Apr. 22, 2011, all of which are incorporated herein by reference.

FIELD OF THE EMBODIMENTS

The present invention relates to systems and methods that enable operators of electric vehicles (EV) to obtain charge and information regarding charge availability.

BACKGROUND

Electric vehicles have been utilized for transportation purposes and recreational purposes for quite some time. Electric vehicles require a battery that powers an electric motor, and in turn propels the vehicle in the desired location. The drawback with electric vehicles is that the range provided by batteries is limited, and the infrastructure available to users of electric vehicles is substantially reduced compared to fossil fuel vehicles. For instance, fossil fuel vehicles that utilize gasoline and diesel to operate piston driven motors represent a majority of all vehicles utilized by people around the world. Consequently, fueling stations are commonplace and well distributed throughout areas of transportation, providing for easy refueling at any time. For this reason, fossil fuel vehicles are generally considered to have unlimited range, provided users refuel before their vehicles reach empty.

On the other hand, owners of electric vehicles must carefully plan their driving routes and trips around available recharging stations. For this reason, many electric vehicles on the road today are partially electric and partially fossil fuel burning. For those vehicles that are pure electric, owners usually rely on charging stations at their private residences, or specialty recharging stations. However specialty recharging stations are significantly few compared to fossil fuel stations. In fact, the scarcity of recharging stations in and around populated areas has caused owners of electric vehicles to coin the phrase "range anxiety," to connote the possibility that their driving trips may be limited in range, or that the driver of the electric vehicle will be stranded without recharging options. It is this problem of range anxiety that prevents more than electric car enthusiasts from switching to pure electric cars, and abandoning their expensive fossil fuel powered vehicles.

It is in this context that embodiments of the invention arise.

SUMMARY

Embodiments are provided for charge units (CUs) having auxiliary batteries and interfaces for managing charge to auxiliary batteries and vehicles. The CUs include data interfaces and controls that enable users to set charging configurations for auxiliary batteries. The auxiliary batteries are configured to manual loading into a vehicle and connection to a plug within the vehicle. The auxiliary battery can be connected to a dock of the CU. The dock can be a simple cord connection or can be in the form of a form factor of the CU. The form factor, in one embodiment, will provide plug/contact interfaces that allow the battery to sit or connect and interface with the CU. In one example, the dock can be built into the CU. In one embodiment, the dock can be an add-on module that connects to an existing CU. Once the auxiliary battery is plugged into the vehicle, the auxiliary battery can provide charge to the vehicle to extend the range. User interfaces are provided to provide drivers with the auxiliary battery data, such as current use, range provided, extended range, and pairing with specific vehicle models.

In one embodiment, data regarding the vehicle charge state or the charge state of the auxiliary battery can provided in notifications. The data exchange can be via portable devices, which enable synchronization of data and access to cloud services. In some embodiments, graphical user interfaces (GUIs) can enable remote access to the CUs and/or the vehicle, to set or control charging parameters.

In one embodiment, a charging unit for charging an electric vehicle is provided. The charging unit is connectable to a charge source (e.g., electricity) and has a connector (e.g., cord and plug) for coupling the charge unit to the electric vehicle. The charge unit including a port for interfacing with and charging an auxiliary battery. A display has a graphical user interface (GUI) for providing (a) charge status information of a main battery of a vehicle when the vehicle is connected to the charge unit via the connector and (b) charge status of the auxiliary battery when connected to the port of the charge unit. The charge unit further including a communications port for interfacing with cloud services over the Internet. The communications port providing data of the charge unit to the cloud services, for access and control by a remote computer. The communications port further providing data of the charge unit to vehicle electronics via cloud services, for display of charge status of one or both of the main battery and the auxiliary battery on a vehicle display.

In one implementation, the charge unit can include a dock connected to the charge unit via the port, the port provides for interfacing electrical charge and data between the auxiliary battery and the charge unit.

In one implementation, the communications port includes a network interface card (NIC) for communication with the Internet.

In one implementation, the connector for coupling the charge unit to the electric vehicle includes cables for transferring charge and exchanging data, the exchange of data is with automobile logic and the vehicle display.

In one implementation, the charge unit is networked to a plurality of charge units via cloud services, the cloud services providing user accounts for accessing data of specific charge units and for controlling charging functions of the charge units.

A method for managing charging functions of a charge unit over the Internet is provided. The method includes executing charge services to manage accesses to charge units. The executing can occur, for example, on a server. The method includes receiving a request at the charge services to access a charge unit when connected to a vehicle. The method generates status data for the charge unit and state of charge of the vehicle when connected to the charge unit. The method sends a notification to a remote user for display on a portable device or any computing device. The notification including the status data having current charge of one or both of a main battery of a vehicle or an auxiliary battery coupled to the charge unit.

In one implementation, the request is received from one or more of a portable device, a computer, or device having Internet access.

In one implementation, the status data includes an estimated range for current charge of the main battery or the auxiliary battery.

In one implementation, the notification is sent based on predefined settings.

In one implementation, the status data includes battery life or projected battery life. In one example, the status data regarding the battery life or projected battery life is electronically sharable with a third party that offers maintained or replacement batteries. For instance, the user can allow a car dealer to receive notifications when the battery life is failing or falling below a threshold. Being electronically shareable can include sending emails, sending notifications via cloud based user accounts, sending text messages, sending alerts to a main server of a dealer, a store, a reseller, etc. By sharing this information, the user can receive a response regarding availability or pricing associated with repairing, preplacing or ordering a new battery. In this manner, a battery can be obtained, ordered, reserved or paid for before the battery wears out or stops working.

In one implementation, the auxiliary battery is paired to a vehicle by model type.

In one implementation, charge services include or provide charge statistics, charge unit location identifiers, charge unit locations having nearby consumer services, mapping services to charge units and services, and mapping services with discounts identified for selected charge units.

In one implementation, the charge services include access to an advertising back-end to accept advertisements for posting at selected charge units.

In one implementation, a detection signal is received from the charge unit to identify when an auxiliary battery is connected to a charge unit and obtaining data from the charge unit regarding the charge status of the auxiliary battery, the status of the auxiliary battery saved in cloud storage associated with the cloud services.

BRIEF DESCRIPTION OF DRAWINGS

The invention may best be understood by reference to the following description taken in conjunction with the accompanying drawings.

DETAILED EMBODIMENTS

Embodiments are provided for charge units (CUs) having auxiliary batteries or interfaces for managing charge to auxiliary batteries. The CUs include data interfaces and controls that enable users to set charging configurations for auxiliary batteries. The auxiliary batteries are configured to manual loading into a vehicle and connection to a plug within the vehicle. Once plugged, the auxiliary battery can provide charge to the vehicle to extend the range. User interfaces are provided to provide drivers with the auxiliary battery data, such as current use, range provided, extended range, and pairing with specific vehicle models. In one embodiment, data regarding the vehicle charge state or the charge state of the auxiliary battery can provided in notifications. The data exchange can be via portable devices, which enable synchronization of data and access to cloud services. In some embodiments, graphical user interfaces (GUIs) can enable remote access to the CUs and/or the vehicle, to set or control charging parameters.

A number of embodiments are described below, with reference to specific inventive implementations and/or sub-embodiments that relate to electric vehicles, charging methods, wireless device synchronization to exchange information regarding charging events, cloud based processing technologies to share charge availability information, discounts across a charge supply grid, geo-location mapping and charge finding, user interfaces, charge unit identification systems, user interfaces to unify acquisition of charge, reservation of charge, charge units with color indicators to signal charge status and availability, charge supply systems and infrastructure for connecting charge to electric vehicles (EVs), cloud based databases and distributed data centers for tracking charge usage and sharing charge usage with charge providers, utilities, drivers of EVs, owners of charge units (CUs) and owners or managers of charge unit install points (CUIPs).

In one implementation, the listed embodiments may be viewed broadly to define separate defined embodiments. In other implementation, the listed embodiments may be combined with one or more of the respectively listed embodiments to define unified embodiments. Therefore, the headings noted in the following sections are only provided for ease of reference and discussion, along with the appended drawings.

Figure 1:
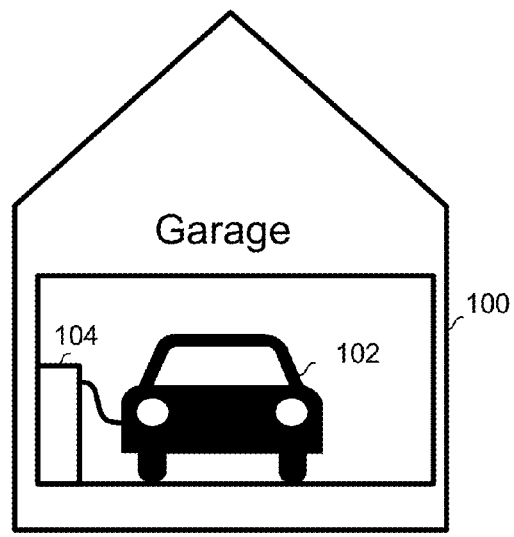
FIG. 1 shows a charge unit (CU) that can be installed in various locations, such as a garage of a home, in accordance with one embodiment of the present invention.

Methods and systems for charge units that can include user interfaces and connections with auxiliary batteries. FIG. 1 shows a charge unit (CU) 104 that can be installed in various locations, such as a garage 100 of a home, in accordance with one embodiment of the present invention. Other locations can include anywhere power can be provided to a charge unit (CU) or where charge can be generated, such as by solar panels or the like. Thus, the example of a home garage is only provided to illustrate one implementation.

Figure 2:
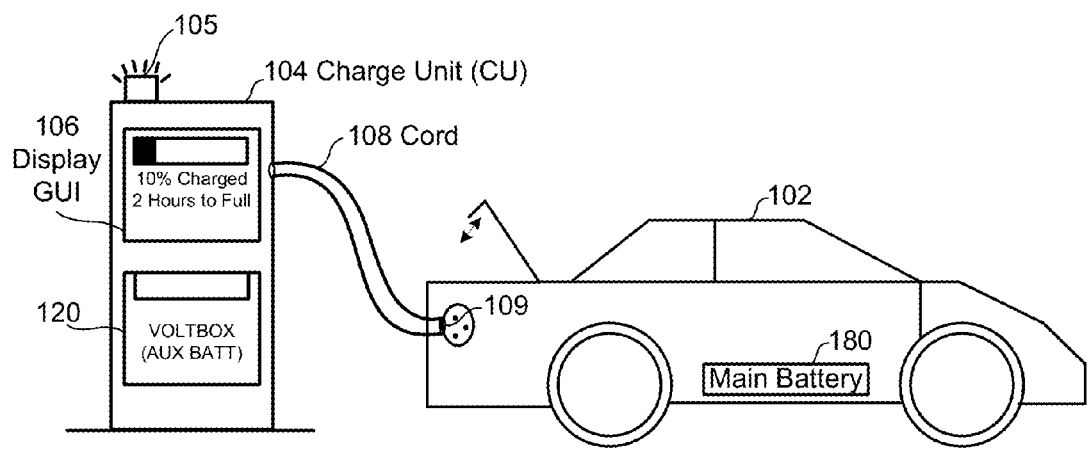
FIGS. 2 and 3 are example embodiments of the present invention, where a CU having an auxiliary battery and display screen are shown.
Figure 3:
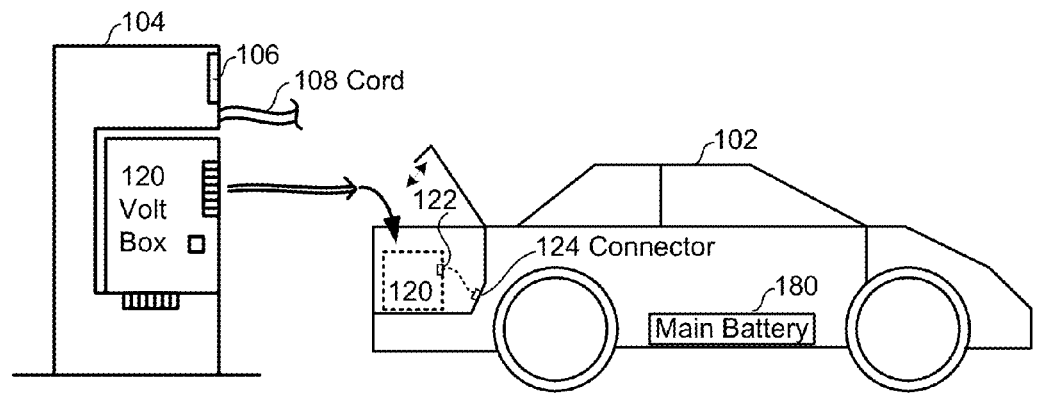

In one embodiment, the CU 104 can include a display graphical user interface (GUI), a wireless connection 105 for communicating with cloud charge services. Connections can also be wired, such as by Ethernet wires or the like. The display GUI 106 can provide various types of information, such as the charge level of the vehicle 102. Other examples of information provided, or requests made to the CU from a remote access or local access is provided below. The CU 104 can be connected to the vehicle 102 via a plug 109. The vehicle 102 can include a trunk (or any space or location on the vehicle) where an auxiliary battery 120 can be inserted to extend the range of the vehicle 102. The auxiliary battery 120, as shown in FIGS. 2 and 3, can include connectors or ports that can enable connection to the CU 104 to collect charge and exchange control data.

In one embodiment, the auxiliary battery 120 includes electronics that can monitor charge status, historical charges, and state of charge cells in the battery, detected faults, and operational data. The information collected or generated by the battery 120 can be provided to the CU when it is connected or interfaced with the CU. In one embodiment, the information collected or provided by the battery 120 can be shown on a GUI of the CU. The data can also then is accessed from a portable device. The data, can include the health of the battery. The health of the battery can change over time, so this information can be used to estimate a range provided by the auxiliary battery, or reduced range, or possible failure. The data in the CU and the battery 120 can be shared and interfaced with cloud services, and this data can be shared with CU providers, manufacturers, or other users on the grid.

The control data can be charge levels of the auxiliary battery 120 or use data, so that information can be displayed on the CU 104. In another embodiment, remote access can be made to the CU 104. The auxiliary battery 120 can be moved into the trunk or some other area of the vehicle. Once in the vehicle, the auxiliary battery 120 can be connected via a connector 122 to a connector 124 of the vehicle 102.

Figure 4:
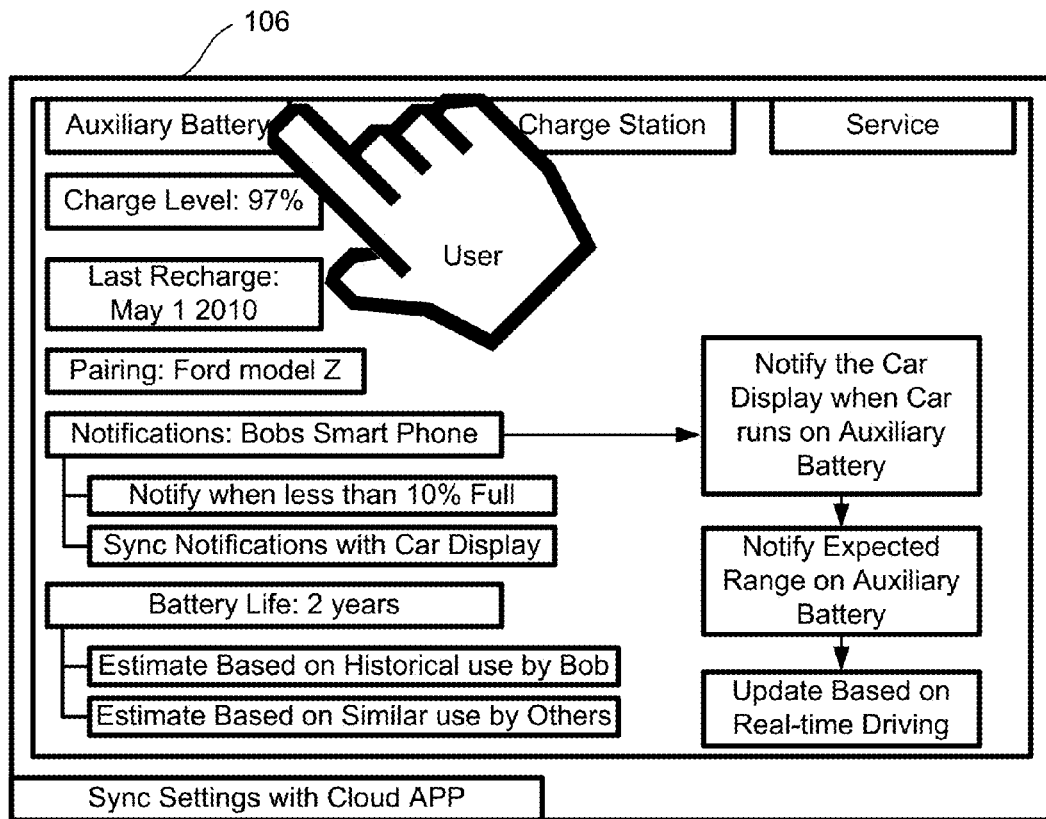
FIG. 4 shows an example of a display GUI of the CU, in accordance with one embodiment of the present invention.

In one embodiment, FIG. 4 shows an example of a display GUI of the CU 104. Information on the GUI can also be accessed via a remote computer. The display can provide data, such as charge level, last recharge, pairing, notifications, battery life for the auxiliary battery, sync settings for the cloud app, etc. The interface can include location identifying controls to find CUs, by selecting charge stations. Service button to find service for the CU or the EV.

In one embodiment, the status data regarding the battery life or projected battery life is electronically sharable with a third party that offers maintained or replacement batteries. For instance, the user can allow a car dealer to receive notifications when the battery life is failing or falling below a threshold. Being electronically shareable can include sending emails, sending notifications via cloud based user accounts, sending text messages, sending alerts to a main server of a dealer, a store, a reseller, etc. By sharing this information, the user can receive a response regarding availability or pricing associated with repairing, preplacing or ordering a new battery. In this manner, a battery can be obtained, ordered, reserved or paid for before the battery wears out or stops working. The notifications can also be sent for other vehicle parts that may need maintenance. For instance, a user can set notifications to be automatically sent to a dealer or authorized agent or advisor.

The notifications can include real-time state of the vehicle concerning parts or elements of the vehicle that may be wearing or need repair. The recipient of the notifications can then reply or suggest that the user come in for service. The recipient can be a mechanic, a car dealer service department, a third party that provides recommendations for repair.

The plurality of third parties that can also bid on work (e.g., work that is needed for particular vehicles that report some repair needed). The third parties can be part of a group of crowd that can bid on performing a repair for a part or system of the vehicle. The group can be, for instance, a group of approved mechanics, stores or dealers, or combinations thereof, or the like. In this manner, the user may be assured a better price for the service when multiple qualified parties bid on performing the work.

Figure 5:
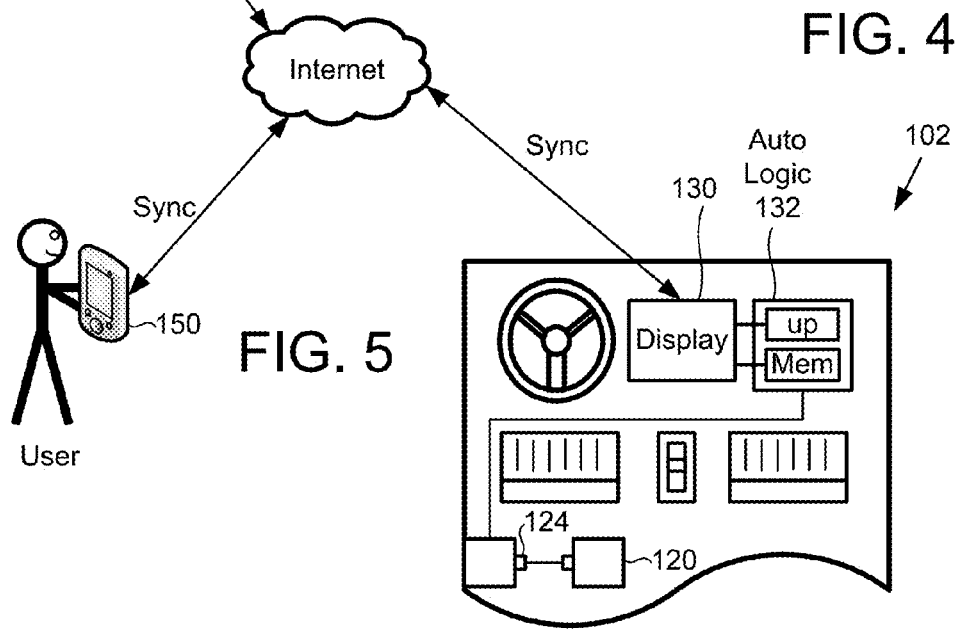
FIG. 5 shows a user holding a device, such as a smartphone or Internet connected device that can connect to cloud services, in accordance with one embodiment of the present invention.

In FIG. 5, the user holding a device 150, such as a smartphone or Internet connected device, can connect to cloud services. The cloud services can provide data regarding the charge level of the vehicle 102, the status of the auxiliary battery 120, the level of charge of the vehicle 102 via exchange of data from a synchronization (sync) to auto logic 132. The display 130 of the vehicle 102 can also sync to data on the device 150.

Figure 6:
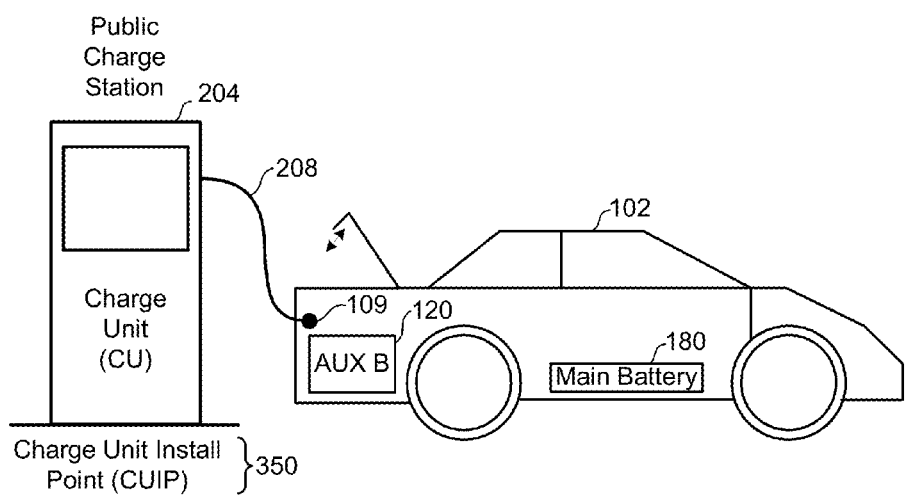
FIG. 6 shows the vehicle connected to a CU that is a public CU, at a CUIP (charge unit install point), in accordance with one embodiment.

FIG. 6 shows the vehicle 102 connected to a CU 204 that is a public CU, at a CUIP (charge unit install point) 350, in accordance with one embodiment. The vehicle has the auxiliary battery 120 and a main battery 180. The CU 204 can connect to the vehicle 102 via cord 208. The cord 208 is a connector that provides the link between the CU and the outlet in the vehicle. The cord 208, in one embodiment, has a handle that provides a way for a user to hold the end of the cord and insert the outlet on the cord to the receptacle on the vehicle.

Figure 7:
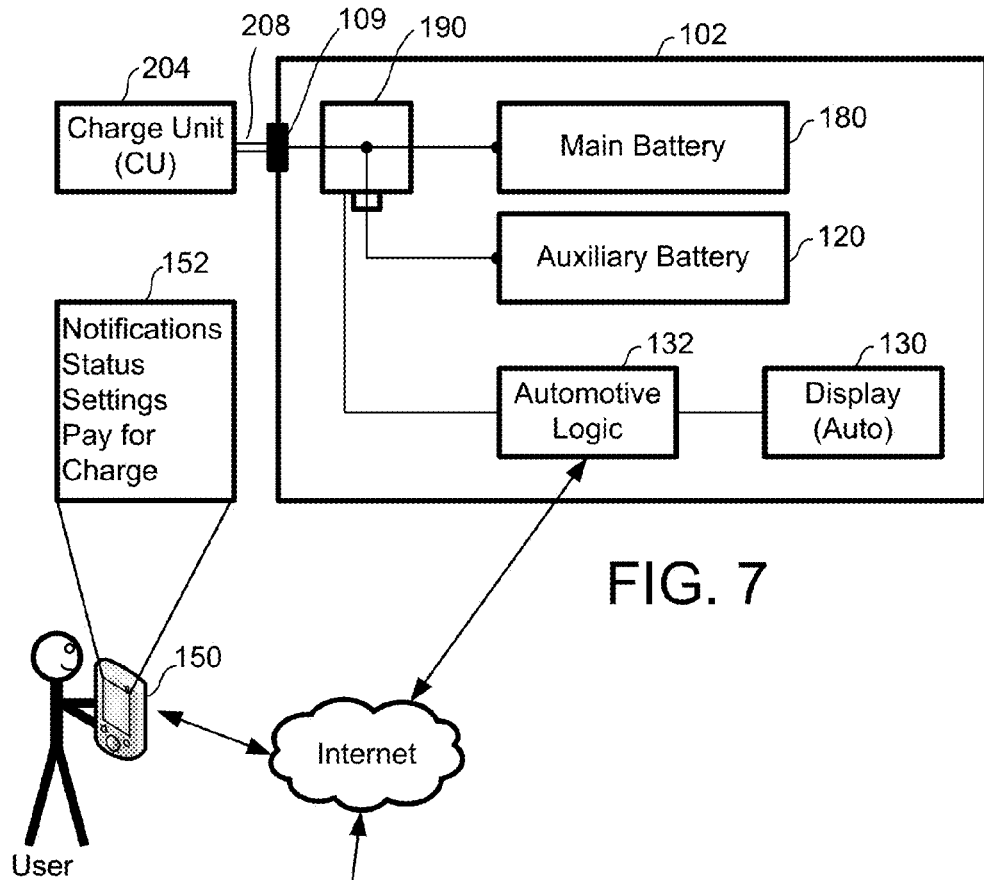
FIG. 7 shows example electronics of a vehicle, in accordance with one embodiment of the present invention.

FIG. 7 shows example electronics of a vehicle 102, in accordance with one embodiment of the present invention. The vehicle 102 can include a main battery 180, an auxiliary battery 120, automobile logic 132, and display 130. The CU 204 is connected to vehicle 102 via 208. The user can communicate with the vehicle or the CU, via device 150. Information, such as notifications, status, settings, pay for charge, or commends to the CU or vehicle can be made via connected device 150.

Figure 8:
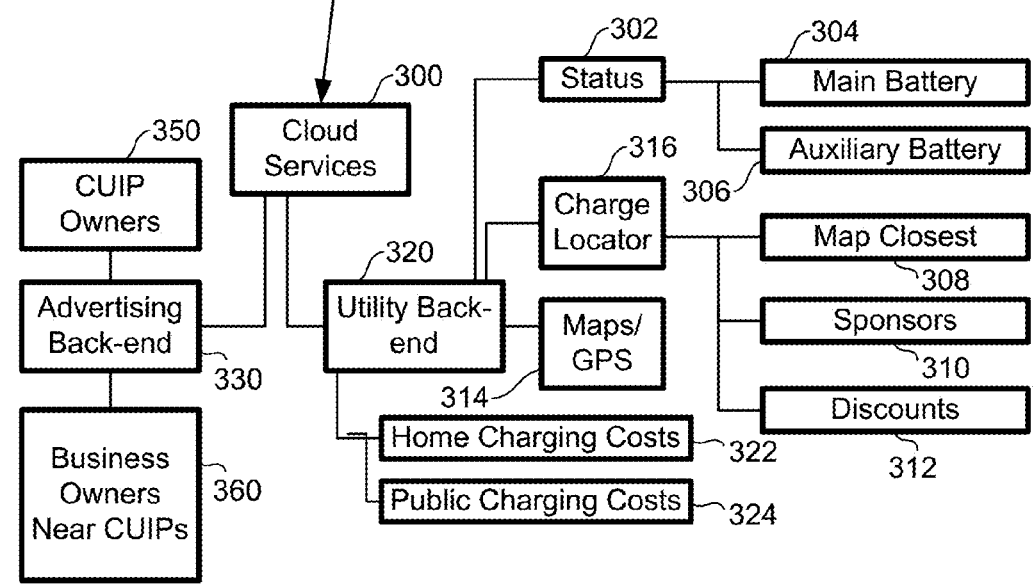
FIG. 8 illustrates an example of cloud services interfacing with the vehicle, in accordance with one embodiment of the present invention.

FIG. 8 illustrates an example of cloud services 300 interfacing with the vehicle 102. The CU 204, connected by cord 208 can connect to point 109 of vehicle 102. Interface 190 will provide a junction that is switch-connected to one or both of the main battery 180 or auxiliary battery 120. The vehicle 102 can include automobile logic 132 and display 130. The automobile logic 132 can communicate with the internet and the cloud services 300. Cloud services 300 can be connected to a number of systems and subsystems. One subsystem is an advertising back-end 330. Advertising back-end is an interface that allows publishers of advertising to submit ads to be forwarded to EVs, CUs, and others in the chain of charge systems. In one embodiment, the advertising is context specific. The context can be in relation to the geographic location of the charge unit and the surrounding goods and services associated with the ad. In another embodiment, the contextual relation can include information concerning the user or users associated with an account used to charge the vehicle. The account can include or be associated with databases that store likes and dislikes of the user, preferences, historical buying data, and data associated with other users that have similar characteristics. In one embodiment, CUIP owners 350, business owners 360, and other third-party entities can submit and post advertisements. The Cloud services 300 can also be connected to utilities back-end 320, home charging costs 322, public charging costs 324, etc.

In addition, the cloud services 300 can also be connected to data sources or metrics stored for handling status 302, charge location apps or routines 316, maps and GPS 314, maps that find closest CUs meeting particular criteria, sponsors 310 that may sponsor free or partially paid charge a certain CUs, and discounts 312. Again, the cloud services is a system that manages interfaces to EVs, CUs, manufacturers of CUs, utility companies, users of such information, advertisers, partners that make parts for CUs, that make parts for EVs, or sell and make EVs.

FIGS. 9A-11 illustrate examples of using the vehicle's own horizontal and vertical movement in order to generate electricity. As vehicles travel on a plane they are subject to horizontal and vertical g-force acceleration. This acceleration is currently not being used to its full potential. These forces can be used much like regenerative braking is used to produce electricity to charge a vehicle battery or drive a vehicle electric motor. Force inertia from a vehicle's travel is maintained in the direction of travel even as the vehicle changes directions. This produces brief horizontal and vertical g-forces as a result of the vehicle switching heading and or speed. These forces are also generated under acceleration and deceleration. On example way of capturing this energy is by way of induction. Induction can be used to harness these changes in vertical and horizontal acceleration to produce an electric current much like a watch that can run after being shaken, or much like a flashlight that can be charged by shaking it.

A vehicle can have a system of g-force acceleration harnessing (e.g., force is mass×acceleration). The mass is the vehicle's weight and the acceleration of the mass causes the energy forces that can be harnessed. In one embodiment, electric current producing mechanism can be built into the vehicle when it is manufactured or it can be a bolt on system to aid hybrid and/or all electric vehicles recharge on-board batteries or drive the vehicles motor.

Figure 9A:
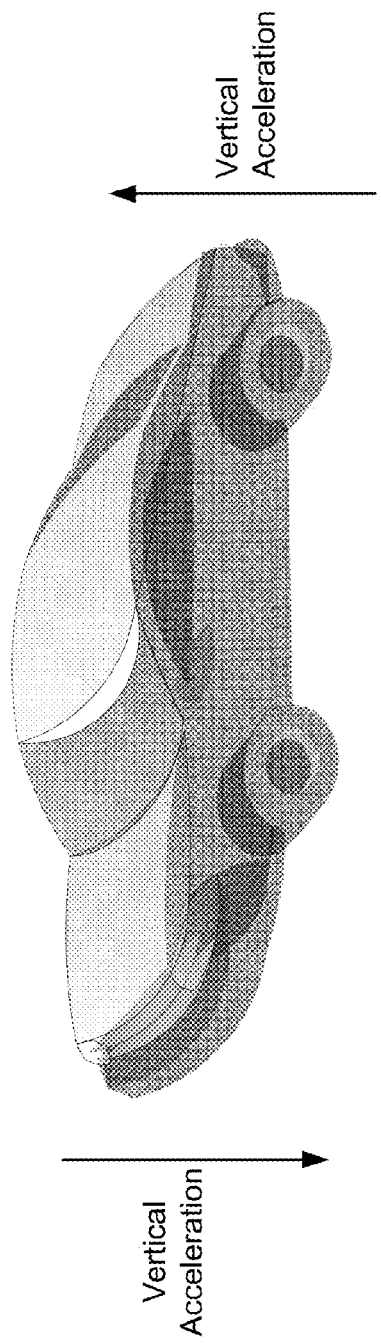
FIGS. 9A and 9B show a side view and a top view of a vehicle with possible vertical and horizontal acceleration indicated.
Figure 9B:
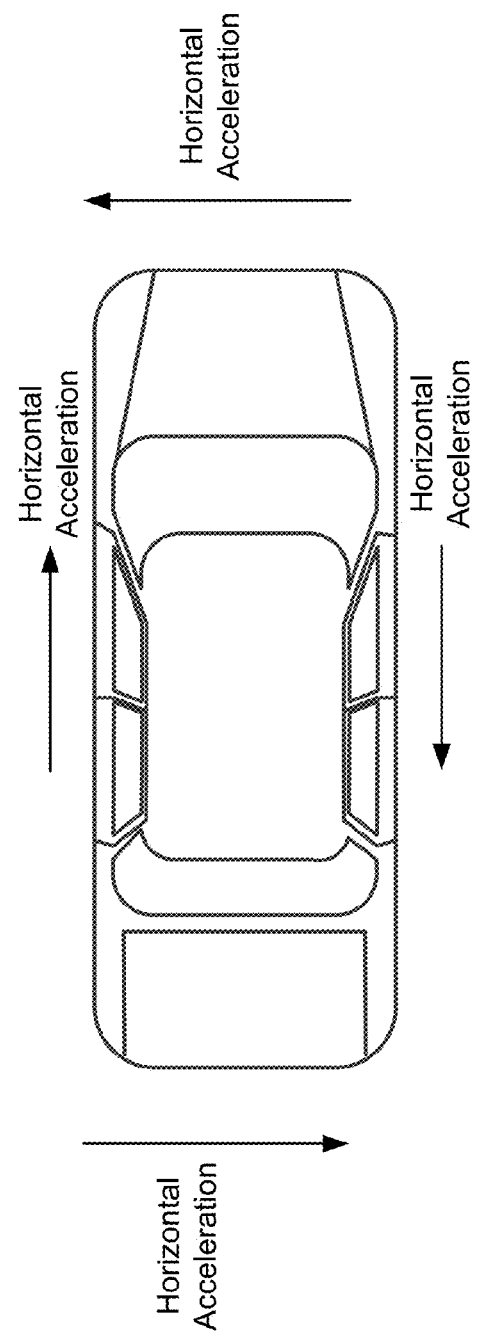

FIGS. 9A and 9B show a side view and a top view of a vehicle with possible vertical and horizontal acceleration indicated. When a vehicle is under acceleration, or deceleration, the force can be harnessed via electromagnetic induction or other energy capturing component to produce a current that can then charge a vehicle's batteries or provide power to its motor. Acceleration or deceleration also causes variations in vertical acceleration as the front of the vehicle rises or falls as well as the rear of the vehicle rises or fall depending on the type of vehicle behavior. These forces can also be harnessed to produce electrical current that can be stored to a battery for use in powering an electric motor.

Figure 10:
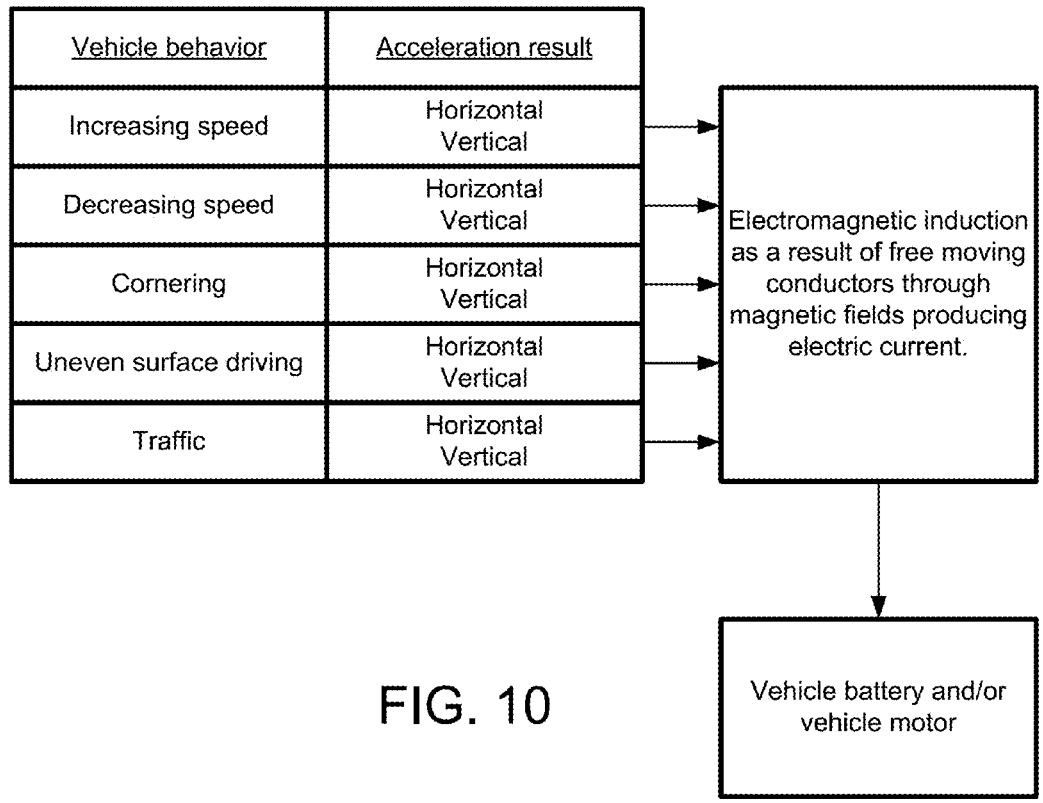
FIG. 10 shows various example vehicle behaviors and the acceleration result.

FIG. 10 shows various example vehicle behaviors and the acceleration result. For instance, increasing the speed on a vehicle causes vertical acceleration as well as horizontal acceleration. As shown, vehicle behavior can also include decreasing speed, cornering, uneven surface driving, traffic, etc. The acceleration result, that is used produce energy can be in the form of horizontal and/or vertical movement of the vehicle, which imparts the g-forces upon a component of the vehicle and thus produces electrical energy that can be harnessed and stored to a battery of the vehicle.

Figure 11:
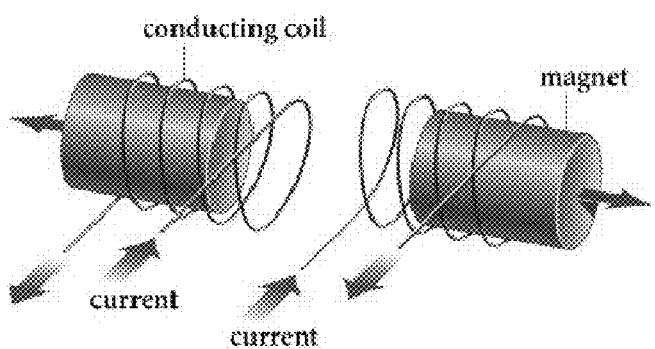
FIG. 11 shows one such method of producing current via induction. In this example, a conducting coil surrounds a magnet.

FIG. 11 shows one such method of producing current via induction. In this example, a conducting coil surrounds a magnet. When the magnet travels within the coil, the movement of flux induces an electric current that is carried through the coil. This current can be harnessed to charge vehicle batteries or drive vehicle motors. Using this example, these systems can be placed in vehicles to harness forces caused by acceleration moving magnets back and forth within coils to produce current. The magnets can be on rails that allow them to flow back and forth fluidly with the least amount of resistance possible. As the vehicle moves or accelerates vertically or horizontally, the magnets flow creating an electrical current. In one example, electromagnetic induction can be used to harness energy as a result of free moving conductors through magnetic fields, which produce electrical current. This example application of a current producing induction system that can be placed on/in a vehicle. As noted, as the vehicle creates acceleration forces, induction causes electrical currents from each induction unit. The electric current can be captured and fed to vehicle batteries or vehicle motors.

Generally speaking, the energy that is being captured is the energy produced when the vehicle moves, e.g., producing g-forces, which are captured to produce electrical energy. The g-forces, as noted in FIG. 10, can simply be uneven surface driving, which can continuously produce energy as the vehicle is drive around. In the same manner, as the vehicle stops, accelerates, corners, these g-force producing movements are likewise harnessed into electrical energy usable to charge a battery of the vehicle and in turn power an electric motor of the vehicle.

In some embodiments, systems and methods are provided for charging an electric battery of a vehicle. The vehicle includes a battery for powering an electric motor of the vehicle. A controller of the vehicle is provided to interface with a battery and to enable control of charging of the battery. The controller or on-board computer of the vehicle in interfaced with the g-force producing system. In one embodiment, the controller is configured to sense or determine that energy has been produced by the g-force producing system and then enable transfer of the energy/current to a system that enables storage and/or charging of a rechargeable battery of the vehicle. This type of charging is, as mentioned above, a type or regenerative charging, using the power produced by the g-force producing systems. The vehicle includes a communications interface for enabling wireless communication with a server, and the server is configured to manage a plurality of user accounts for users. The user account may, in some embodiments, store information regarding the power produced by the g-force producing systems. This information may thus be provided to the user account, to enable a user to view a history or status of the energy/power available to the vehicle and historical data regarding past driving and energy produced and/or used from the g-force producing systems.

Figure 12:
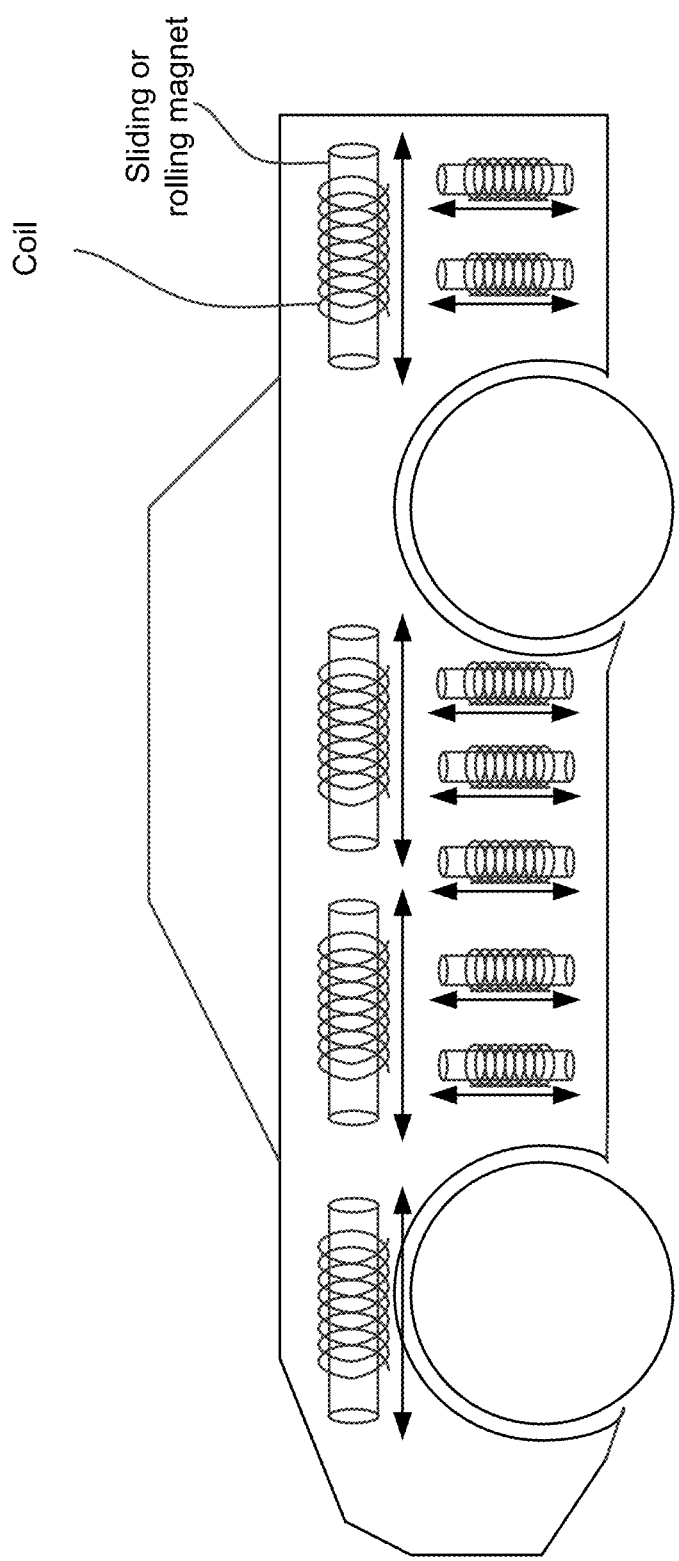
FIG. 12 illustrates a general diagram of a vehicle, which can be equipped with a plurality of energy producing systems.

FIG. 12 illustrates a general diagram of a vehicle, which can be equipped with a plurality of energy producing systems. The illustrated example shows how induction units can be disposed in various locations on or about the vehicle. It should be understood that this illustration is provided simply to show how energy producing systems can be placed and/or integrated on various locations of a vehicle.

Figure 13:
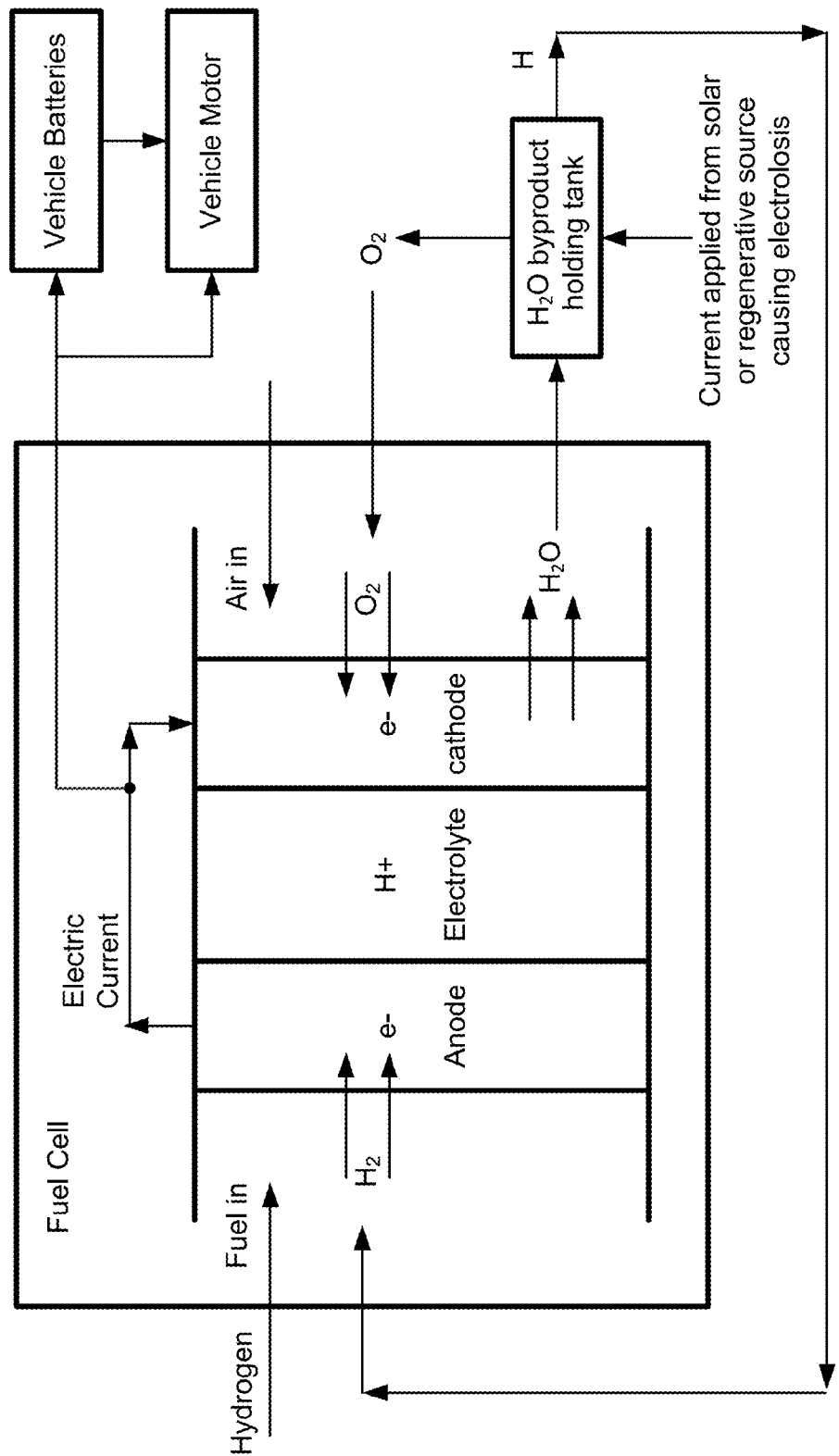
FIG. 13 illustrates an example of another type of fuel cell, in accordance with one embodiment.

FIG. 13 illustrates an example of another type of fuel cell, in accordance with one embodiment. Today's hybrid vehicles run on a combination of traditional fuel and battery power. The power to charge a hybrid vehicle's batteries and drive its motor is provided by plugging a vehicle into a power source or regenerative current. When a hybrid or plug-in vehicle exhausts its fuel and/or electric charge it is no longer operational.

A traditional hybrid system or all-electric plug in vehicle system can be combined with a fuel cell system to provide extended range. Fuel cells produce current by introducing a compressed gas, commonly hydrogen that is pressed against a catalyst having oxygen (sourced from the environment) on the opposite side of the catalyst. A current is produced as electrons are lost to the creation of H2O— a by-product. This current can be used to charge a vehicle's on board batteries to ease range anxiety and to extend the range or a hybrid vehicle. This system can be used as a reserve power source when a charging source is not nearby. Normally, in fuel cell systems, H2O is produced and is drained out of the vehicle requiring a new fill of hydrogen (H2) to repeat the process.

In one embodiment, the H2O byproduct can be re-introduced into the system by storing it in the system as it is produced. When the vehicle reaches a location where a charge and thus an electric current can be introduced, the current can then be passed through the water byproduct causing electrolysis which splits and harnesses the H2 from the O restarting the cycle. Regenerative breaking, g-force power harnessing, roof solar panels or a wall outlet can provide this current for the electrolysis. This fuel cell can be stacked to act as a long range battery to supplement traditional acid, or lithium batteries/traditional fuel.

In FIG. 13, a system is shown which allows a vehicle fuel cell system to recycle byproducts. A fuel cell can take fuel in such as Hydrogen and presses the fuel against an anode and electrolyte. The opposite end of the fuel cell takes in air from the atmosphere where the oxygen is pressed against a cathode and electrolyte. As the Hydrogen and oxygen combine an electric current is produced which can be used to charge a vehicle's batteries or motors. After this reaction takes place, a byproduct is produced in the form of H2O. This H2O or water is then disposed out of the system. In one embodiment, the water may be retained in a holding tank where it can be used to provide the hydrogen fuel and oxygen by splitting the atoms using electrolysis.

Broadly speaking, electrolysis utilizes a current to separate the hydrogen and oxygen atoms apart. Electrolysis can be achieved through solar power produced on board a vehicle, by plugging into the grid or by current produced during regenerative vehicle braking for instance. The hydrogen atoms can be harnessed and stored as fuel to restart the fuel cell cycle and the oxygen atoms can be used to react with the hydrogen atoms thus creating the current as before. This system works to extend range on vehicles with hybrid power systems in which a vehicle may be powered by rechargeable batteries, plug in, traditional fossil fuel, fuel cell or any combination thereof.

In one embodiment, when information regarding EVs historical use, paths taken during the life time of EVs, maintenance called for EVs, maintenance for CUs, etc., is collected, the data can be used to plan for future events. Future events can include, for example, upgrades to CUs, improved data distribution to drivers of EVs, etc. Historical use of "notifications" can also be used by EV makers and CU makers to improve the performance of CUs and data mine the information to enable improved deployment of new CUs and EVs. In one embodiment, the notifications of status can include integrated advertisements. The advertisements can be specific for a time of data or specific for a geo-location of the user or vehicle of the user or the charge station being used. For example, advertisements can include discounts for goods/services proximate to the charge station. Thus, if the user is provided with a notification that charging will take another 10 minutes, the user can be provided with a discount to a local area business while the vehicle continues to charge.

Embodiments are described with reference to methods and systems for providing auxiliary charging mechanisms that can be integrated or coupled to a vehicle, to supplement the main battery of a vehicle. The auxiliary charging mechanism can be in the form of an auxiliary battery compartment that can receive a plurality of charged batteries. The auxiliary battery compartment can be charged without the vehicle, and can be installed or placed in the vehicle to provide supplemental charge to the vehicles main battery. Thus, if the main battery becomes drained/used, the auxiliary battery compartment, having a plurality of charged batteries, can resume providing charge to the vehicle.

In one embodiment, charge from the vehicle can be transferred back to the grid or back to power a home (having a CU), if the home is left without power during an outage or the like.

In one embodiment, the auxiliary battery compartment is configured to hold a plurality of smaller batteries, referred to herein as "volt bars." A volt bar should also be interchangeably viewed to be a "charge unit." The charge unit is a physical structure that holds charge, as does a battery. A charge unit can also be a fraction of charge, which may be contained in a physical structure.

Broadly speaking, a volt bar is a battery that can be inserted into an auxiliary battery carrier. The auxiliary battery carrier, or compartment, can be lifted by human and placed into a vehicle, such as the trunk of the vehicle. The auxiliary charging carrier can then be removed from the vehicle to provide charge to the volt bars contained within the auxiliary battery carrier. For instance, owners of electric vehicles can purchase an auxiliary battery carrier and fill the auxiliary battery carrier with a plurality of volt bars.

In one embodiment, the user will charge all of the volt bars by charging the auxiliary battery carrier before the auxiliary battery carrier is placed into the vehicle. In one embodiment, the auxiliary battery carrier, and its volt bars can be charged utilizing the charge provided from the main battery. For instance, if the vehicle is charged overnight utilizing the primary charging receptacle, and the auxiliary battery carrier is connected to the vehicle (containing volt bars), the volt bars in the auxiliary battery carrier will also be charged.

In one embodiment, once the main battery and the vehicle are charged, the charge will then be transferred to the volt bars contained in the auxiliary battery carrier. As such, charging the vehicle will accomplish the task of charging the main battery as well as the auxiliary battery carrier that includes a plurality of volt bars. In another embodiment, the volt bars can be directly inserted into slots defined on the vehicle itself. In this example, manufacturers will design compartments that can accept one or more volt bars, thus eliminating the need for an auxiliary batter carrier. The compartments can be on the side of a vehicle with or without a door, in the trunk, in the passenger compartment, etc. So long as volt bars can be accepted into a receptacle and the volt bar(s) can provide charge to the vehicle or axillary charge to the main battery, the placement of the volt bar(s) is, in one embodiment, a design configuration.

In one embodiment, the volt bars utilized in the auxiliary battery carrier can be replaced with fresh batteries purchased while the user of the electric vehicle is on a trip or a distance from the user's home base. For instance, volt bars can be sold utilizing a kiosk system. The kiosk system would, in one embodiment, store available volt bars that can be purchased by drivers of electric vehicles while away from their home base. For example, the kiosk system will provide one or a plurality of receptacles for receiving volt bars that are depleted in charge, and dispense charged volt bars to users desiring to extend the range of their trip. The kiosk, in one embodiment, will be coupled to a power source that can then recharge the volt bars and make them available to other users that trade in their charge depleted volt bars.

If the user wishes to purchase volt bar without first returning a charged the depleted volt bar, the user can be charged a separate fee that is higher than if the user had returned a depleted volt bar. The kiosk system would preferably be connected to the Internet so that users of electric vehicles could access an application that would identify locations of kiosk systems with available volt bars. In one embodiment, the application would include software that communicates with an application sitting in a central hub that manages all of the kiosk systems deployed in the field. The kiosk systems will also report the status of available volt bars, volt bars returned and in charging mode, available charging slots, inventory of volt bars, discounts available at particular kiosk systems, and potential damage to volt bars that have been returned. By compiling this information, the kiosk system can interface with the central hub, which provides information to users accessing an Internet application (mobile application), so that users can locate the closest kiosk system or the closest kiosk system having discounts.

In one embodiment, the discounts provided by the specific kiosk systems (or charging locations) can be programmed based on the desire to sell/lease more volt bars at certain kiosk systems with excess inventory, or to encourage virtual routing of volt bars throughout geographic regions. For example, if trends are detected by software operating on the central hub that volt bars are migrating from East to West, a depleted inventory may be found in the East. To encourage load balancing of inventory, discounts can be provided in the West, which would then cause migration of volt bars toward the east. In one embodiment, each of the kiosk systems would be enabled with software that communicates with the central hub, and the software would be utilized to provide the most efficient information regarding inventory, and operational statistics of each kiosk system deployed throughout a geographic region (e.g., geo-location)

In another embodiment, each kiosk system may be configured with an interface that receives payment data from the users. Example payment receipts may include credit card swiping interfaces, touchscreens for facilitating Internet payment options (PayPal), coupon verification, and communication of deals with friends through a social networking application. These applications can be facilitated by software operating at the kiosk station, or by software executing on the users mobile device, or a combination of both. In still another embodiment, each of the volt bars that are installed in the various kiosk stations will be tracked using tracking identifiers. In one embodiment, without limitation, the tracking can be facilitated using RFID tags. The RFID tags can be tracked as users purchase, return, and charge the depleted volt bars at the various kiosk stations.

Additionally, the volt bars will include memory for storing information regarding number of charges, the health of the battery cells, the current charging levels, and other information. Additionally, the volt bars can store information regarding the various kiosk stations that the volt bars have been previously been installed in, or received from. All of this information can be obtained by the software running at the kiosk station, and communicated to the central hub. The central hub can therefore use this information to monitor the health of the various volt bars and can inject new volt bars into the system at various locations when it is detected that the inventory is reaching its end of life.

In still another embodiment, the central hub can direct maintenance vehicles to remove damaged volt bars from kiosks, or insert new volt bars at certain kiosk locations. Because the central hub will know the frequency of volt bar utilization at each of the kiosk locations, the central hub can dispatch maintenance vehicles and personnel to the most optimal location in the network of kiosk stations.

In another embodiment, a system for providing auxiliary charge to a main battery of an electric vehicles is provided. The system includes an auxiliary battery for holding a plurality of charge units, the auxiliary battery being connectable to the main battery of the electric vehicle, the plurality of charge units being rechargeable and being replaceable from within the auxiliary battery, such that replacing particular ones of the plurality of charge units with charge units with more charge increases a total charge of the auxiliary battery.

Also provided is a kiosk for storing a plurality of charge units, the kiosk having, (i) slots for storing and recharging the plurality of charge units; (ii) control systems for communicating over a network, the control system includes logic for identifying inventory of charging units in the kiosk and logic for processing payments and fee adjustments for charge units provided or received in the slots of the kiosk. The system also includes a display for providing an interface for enabling transactions to provide or receive charge units to customers. The system further provides a central processing center that communicates with, (i) a plurality of said kiosk over a network, the central processing center configured to provide for centralized rate changes to prices to charge for the charge units at each of the plurality of kiosks, wherein changing the price of the charge units is specific to each of the kiosks and is based on a plurality of metrics, including availability at each kiosk and discounts, and (ii) a plurality of vehicles, the plurality of vehicles being provided with access to availability information of charge units at each of said kiosks, the availability information being custom provided to the plurality of vehicles based on geolocation.

Another embodiment is for a method for providing charge options to drivers of electric vehicles. The method includes receiving data concerning charge providing availability from charge locations, receiving a request from processing logic of an electric vehicle, the request identifying a desire to obtain charge, and determining a current location of the electric vehicle. The method further includes determining identification of charge locations in proximity to the electric vehicle and determining any sponsored rewards offered by the charge locations. The method communicates to the electric vehicle a path to one of the charge locations, the path identifying a sponsored reward offered at the charge location for the path.

Yet another embodiment, a computer processed method for providing charge options to drivers of electric vehicles is provided. The electric vehicles have wireless access to a computer network. The method includes receiving data concerning charge providing availability from charge locations and receiving data concerning sponsored rewards offered by the charge locations (or discounts or deals or prices) and rules for offering the sponsored rewards. The method receives a request from processing logic of an electric vehicle, and the request identifies a desire to obtain charge in route between a current location of the vehicle and a destination location. The method includes generating a plurality of paths that can be traversed by the electric vehicle between the current location and the destination location, where each of the paths identify possible charge locations at which the electric vehicle can be charged. Each of the possible charge locations identifying any sponsored rewards offered if the electric vehicle obtains charge at the possible charge locations. The method includes forwarding the plurality of paths as options to the user of the electric vehicle via a user interface. The sponsored rewards are identified to the user to enable trade-offs between length of path and reward obtained.

Methods and systems for providing charge options to drivers of electric vehicles are provided. One example method includes receiving data concerning charge providing availability from charge locations and receiving a request from processing logic of an electric vehicle, the request identifying a desire to obtain charge. The method includes determining a current location of the electric vehicle and determining identification of charge locations in proximity to the electric vehicle. The method further includes determining any sponsored rewards offered by the charge locations and communicating to the electric vehicle a path to one of the charge locations, where the path is identified with a sponsored reward offered at the charge location if the path is selected and charge is obtained. The method can be processed by a server and paths are communicated to vehicles to alert drivers of the electric vehicles of rewards or discounts if charge is obtained from certain locations. Other embodiments that compliment sponsored paths for obtaining charge are described below, and relate to electric vehicle charging and reduction of range anxiety.

Embodiments are also described for methods and systems for providing auxiliary charging mechanisms that can be integrated or coupled to a vehicle, to supplement the main battery of a vehicle. The auxiliary charging mechanism can be in the form of an auxiliary battery compartment that can receive a plurality of charged batteries. The auxiliary battery compartment can be charged with or without the vehicle, and can be installed or placed in the vehicle to provide supplemental charge to the vehicles main battery. Thus, if the main battery becomes depleted, the auxiliary battery compartment, having a plurality of charged batteries, can resume providing charge to the vehicle.

In other embodiments, the auxiliary battery can be one compartment that has multiple smaller compartments for receiving volt bars (charging units), or other battery type charging devices. Further, the auxiliary battery is shown interconnected to the main battery of the vehicle, or to a battery distribution or charge distribution-handling unit. In other embodiments, the auxiliary battery can be inserted into side panels of the vehicle, in the front compartment of the vehicle, the floorboard of the vehicle, the site support structure of the vehicle, etc.

Cloud processing technology is also provided, which provides processing resources to connected vehicles through a distributed network. In one embodiment, the cloud processing can communicate with various charging stations using Internet connections, where charge Station metrics can be uploaded to the cloud processing system. The charge Station metrics can include availability of charge pumps, charge handles, charge plugs, charge mats (for wireless charging), volt bars, or other charge providing facilities.

Examples of such metrics can include the number of charge pumps available at particular period of time, historical availability times of the charge pumps, typical charge time estimates at particular charging stations, prices associated with the charge at the particular charging stations, feedback from customers through social networks, concerning the charging stations, and the like. The cloud processing can then process the charge Station status, traffic information associated with locations around or between charging stations and a user's current location, and provide specific suggested routes. The route generator can provide guided routes to the various charging stations (e.g., charge locations), based on the users immediate needs, desire for discounts, sponsored rewards, or the amount of time it will take to obtain access to a charge pump at a particular point in time. Broadly speaking, a discount is a reward and a reward is a discount, and a sponsored reward is a discount that is at least partially paid by another party for a the benefit of the recipient of the reward.

The driver location processor can communicate the information concerning drivers to the cloud processing logic, so as to provide the most effective information concerning charge availability to the various drivers. For example, users in their particular vehicles may have a connected display or a portable device having access to the Internet. Based on the user's location and charging needs, (and optionally the destination) the user can be provided with route options (e.g., one or more optional paths). The route options can be, for example, the fastest and most available charge Station (or charge providing devices) to the users current location, the cheapest charge available at a particular point in time, or information regarding charge prices for a particular future point in time.

Once the user selects a route option, the route generator can provide information concerning the charging station, and can also prepay or book a charging station slot. A charging station slot can include, for example a parking spot in front of a charging station. The charging station slot can be reserved if the user decides to prepay for the charging station, as a convenience. For example, if charging slots at a particular charge Station appear to be heavily used, a user can pre-reserve a charging slots ahead of time, so that when the user arrives at the charging station, the charging slot will be immediately available. This could be considered a convenience fee associated with pre-reserving of a charging slot, along a particular route. In another embodiment, the charging station can provide incentives to users to come to the particular charging station.

For example, if the user prepays for charge at a particular charging station, the charging station can provide a discount on the charge provided. For example, if the charging station wishes to fill a plurality a charging slots during a particular slow time, the charging station can communicate with the cloud processing and publish availability of its charging stations per particular period of time. A database associated with cloud processing will hold this information so it can be dynamically updated and accessed in real-time by users to fill their charging needs of their electric vehicles. During that particular period of time, the charging station can offer discounts or rewards to users so that drivers can decide to visit the charging station instead of another charging station. Still further, charging stations can offer discounts for users to use the particular charging station, and the discounts can be offered by more than one party or entity. For instance, if the charging stations are located near a particular business, that particular business can sponsor discounts or rewards at the charging station to drive traffic to or near that particular business. When users are charging their vehicles at the particular station near the particular business, users can spend their time at the particular business while their vehicle is being charged.

Potentially, the owners of the particular business that sponsored the discounts can increase traffic to their business and increase sales. In another embodiment, the owners of the particular business can offer discounts to their business products or services, if the business products or services or located near or beside the charging station. As will be described below, other embodiments can include having charging station pumps or handles or plugs, located in nontraditional charging station configurations. For example, charging plugs can be installed at various nontraditional locations, such as parking lots of retail stores. Other examples locations can include, without limitation, parks, city streets, parking garages, post offices, government areas, schools, offices complexes or campuses, coffee shops, malls, strip malls, box store parking lots, beach parking, homes, public roads, etc. If a large retail store has a large parking lot, a portion of that parking lot can be dedicated for charging plugs, which can be used by customers while the customers shop at the retail location. In such a situation, the owners of the retail store that have charging plugs assigned to particular parking spots, can publish availability of those charging plugs through the cloud processing network.

The cloud-processing network can then publish availability and prices for users that may be driving around, or may be passing by the retail store along a particular path or route. In some embodiments, the retail store can offer significant discounts for charge, if users charge their vehicles at the charging plugs of the retail store. While the users charge their vehicles, the users may visit the retail store and purchase goods or services, which is a reward for the retailer that is offering the discount for the charge. In still another embodiment, retail stores having charge plugs can advertise availability of the charge plugs (and parking spots) in real time, and provide discounts or deals to users that may wish to charge at the particular retail location.

The discounts can be for the goods and services of the retail store, or simple discounts on the charge provided by the charge plugs of the retail store. As noted above, one embodiment would allow the parking spots having the charge plugs to be reserved and advance, to provide additional convenience to users. In such a configuration, the parking spots can include mechanical barriers that lift and close to allow vehicles to come into and leave the particular parking spots. Thus if a parking spot is reserved, the mechanical barrier can remain closed until the vehicle having the code can communicate access to lift the mechanical barrier so that charging can commence immediately upon arriving at the reserved parking spot. In another embodiment, the charging station or plug can include a monitor or display that indicates whether or not the charging plug is reserved.

If the charging plug is reserved, no other user can park in front of the parking spot, or else received a ticket or fine for parking in a parking spot that's been reserved. The parking spot reservation for charge can be made in advance; such as while user is driving around smart phone, or an integrated device of the vehicle that has access to the Internet makes looking for charge and the reservation. The transaction can also allow a user that is searching for charge to prepay for the charge using a graphical user interface or other exchange mechanism, associated with the route and reservation of a particular charge station or slot. In some embodiments, the charge stations or plugs can be placed in shared parking lots or locations where multiple retail outlets reside.

In such a case, multiple retailers can provide discounts to users to come and use the charging stations located at the retailer's locations. These discounts can then be published to the cloud processing logic. These discounts can also be published dynamically at the request of the provider of the charge, using an Internet portal that allows the user to participate in a network of charge stations that provide discounts. In such embodiments, the discounts can be provided by multiple retailers for their goods and services, and the plug can be located in the shared parking lot. Having this information, the cloud processing can communicate with a route generator to generate various routes (e.g., paths) that are optimized to the user's desired outcome.

The optimization can be to route a user for charge along a plurality of charge stations or plugs that provide discounts. If this is the goal of the user, the route may be longer than other routes, but the discounts may be greater. Such routes may be viewed as a sponsored path that requires a user to traverse a particular route in order to obtain charge for their vehicle. The sponsored routes can change dynamically over time, as sponsors decide to add or remove discounts. Thus, a user that finds a good path may wish to buy now, to avoid losing the discount. If a particular charge station or chart plug has a lot of customers during a particular period to time, the discounts may drop dynamically. If the charge plug for station experiences low activity, the discounts may be increased dynamically. The dynamic adjustment of discounts can occur based on a preset number of rules (e.g., what discount, where offered, when offered, how long it lasts, incentives for fast buy, logic for combining discounts, logic for sharing costs of discounts with others, logic for reducing the cost of the charge, etc.), as set by the provider the charge and/or the sponsor.

The cost for the charge can also be provided with a green rating, which signifies how efficient the charge station is in supplying charge, and the location and source of the charge provided by the charging station. If the charging station obtains charge from wind power, the green rating would be high. If the charge station receives its charge from fossil fuels, the green rating may be lower. If the charging station receives is charge from a variety of different sources, whether solar, wind, or fossil fuel, the green rating can be adjusted. This metric information can then be provided to the cloud processing to allow users of electric vehicles to decide whether or not to visit a particular charge station or charge plug.

In some embodiments, the price of the charge may be more expensive if the green rating is very high, but the charge value to the user may be high, if the user wishes to obtain a very high green rating, and a lower carbon footprint.

For example if the user wishes to replace the vehicle, the user can simply click a button, select an icon, touch a screen, speak a command, gesture an input, etc., to figure out what his vehicle value is, the cost of a replacement vehicle, and the total cost after exchange. This information can be useful to the user in deciding whether or not to trade in the vehicle or remain with the current vehicle and make investments in repairs. As shown, the data exchange between vehicles and the vehicles and the cloud processing can be extensive, but such information can be made available to drivers of those vehicles to make informed decisions.

The drivers can also be provided with information of the duration of the discount, so that drivers can obtain the discount if they have the time to traversed the path, or avoid the path if the discount will not be present when the driver arrives at that application. In another embodiment, the logic in the vehicle or the processing system in the cloud processing can determine whether or not the user would be able to arrive at each of the charging stations or plugs to receive the sponsor discounts. This analysis can include, for example, reviewing traffic patterns, travel speeds and estimates to traverse the different distances, time of day, etc.

In some embodiments, the discounts are provided by a combination of the charge station and retail shops nearby. In other embodiments, the retail shops and plugs/charge providers can provide combined packages of discounts, which could drive users to their location. Accordingly, it should be understood that the dynamic generation of paths could be sponsored, such that the user can be provided with identification of charging locations along a particular path, and the discounts that may be provided along those particular paths.

Again, the information displayed to the user can be displayed in the vehicle's display screen or can be displayed on the users display device (e.g. smart phone, computer, tablet, etc.).

Broadly speaking and without limitation, obtaining charge will include plugging the vehicle into a charging receptacle so as to charge the native battery of the vehicle. In another embodiment, obtaining charge can also include refilling on volt bars to replenish volt bars that have been used during the vehicle usage. In other embodiments, charge can be transferred to a vehicle wirelessly (e.g., without plugging in an outlet or receptacle). Examples can include a transfer surface that the vehicle parts over, and the charge can be transferred wirelessly to the vehicle via conductors on the underside of the vehicle. The vehicle can simply part in the slot and once payment is made, the charge can start to flow capacitively or wirelessly to the electric vehicle.

As can be appreciated, the sponsored path process can provide a quick and efficient manner for allowing the user to identify their desired endpoint, and provide options for traversing a path to that and point. Along that endpoint, the user can be provided with discounts for charge by sponsors, which can influence or drive people to their charging outlets. The discounts can also be provided in a hybrid manner, such as providing discounts for the charge and discounts with in the retail outlets that are located proximate to the charging stations.

Providing this information to drivers in real time is efficient for both drivers and the retail locations. Drivers in their electric vehicles will need charge, and providers of the charge will benefit from driving users to their location. If the user is still progressing along their desired path, the providers of the discount are simply providing a service and driving customers to their location, where the drivers may purchase other goods and services while the vehicle is being charged.

In one embodiment, the sponsored paths may be generated on electronics and circuitry of the vehicle, or by processing in the cloud processing system (e.g. networked Internet systems). In some embodiments, the sponsor paths may be processed partially on the vehicle and partially on the cloud processing system. In some embodiments, the sponsored paths would be dynamically generated on the cloud processing system, and the vehicle or smart phone of the user would simply connect to the cloud processing system.

The data exchange can therefore be dynamically set to be real time, such that providers of the discounts, providers of the charge, and drivers of the vehicles can exchange information. In this example, the provided to the charge can provide discount information, incentives, etc., and the drivers of the vehicles can provide information concerning their desired paths. The processing system can then generate a plurality of options for the user to traverse from point A to point B. For example, the user can select to traverse a sponsored path, to a particular address. The display the vehicle can then requested the user identify whether or not a sponsored path is desired.

A number of embodiments are described below, with reference to specific implementations that refer to vehicles, but such implementations should be broadly construed to include any type of vehicle, structure or object. Without limitation, vehicles can include any type of moving object that can be steered, and can include vehicles that are for human occupancy or not. Vehicles can include those that are privately owned, owned by corporations, commercially operated vehicles, such as buses, automobiles, trucks, cars, buses, trains, trolleys, etc. Example vehicles can include those that are combustion engine based, electric engine (EV) based, hybrids, or other types of energy source vehicles.

In one embodiment, remote services are provided to enable access over the Internet, such as via a website or application of a portable device. The remote service can provide a multitude of cloud services for the user, such as remote control features, remote viewing services, remote alarm controls, remote camera activation, and remote audio/video recording of the vehicle (i.e., areas around the vehicle and inside the vehicle). In one embodiment, the vehicle is able to connect to the Internet (e.g., when the vehicle engine is off, on, and/or is occupied or un-occupied) to allow a user, via a remote cloud service, to access features of the vehicle. The vehicle can be accessed when running, when parked, when stopped, when moving, etc. The vehicle and its audio recording devices and video cameras can be accessed from remote locations, to allow users to remotely communicate with the vehicle or with people riding or residing inside the vehicle.

The remote communication can also allow a person to communicate remotely with people standing outside (or inside) of a vehicle. For instance, if a user is accessing his or her vehicle from a remote location, cameras installed in and/or on the vehicle allow the remote user to see a person sanding proximate to the vehicle. The remote user can then communicate with a person standing proximate to the vehicle using microphones and speakers of the vehicle.

In one embodiment, structures described herein can include parking structures, parking lots, private or commercial buildings, drive-through, bridges, toll roads, highways, shared or home driveways, designated driving and parking areas. In the specific embodiments described herein, vehicles, structures and objects may include circuitry and communication logic to enable communication with a cloud processing system over the Internet.

A cloud processing system, as described herein, may include systems that are operated and connected to the Internet or to each other using local networking communication protocols. A cloud processing system can be defined as an interconnected and distributed physical or virtual software defined network that utilizes virtual or physical processing and storage machines that enable various applications and operating systems to facilitate the communication with and between various client devices (vehicles, user devices, structures, objects etc.). The communication with and between the various client devices will enable the cloud processing system to deliver additional processing information, data, and real-time metrics concerning data obtained from other processing systems as well as client feedback data. The distributed nature of the cloud processing system will enable users of various vehicles, structures and objects to access the Internet, and be presented with more flexible processing power that will provide the requested services in a more effective manner.

The processing systems can be defined from various data centers that include multiple computing systems that provide the processing power to execute one or more computer readable programs. The processing of the computer readable programs and/or modules and/or circuits that can produce operations that can respond to requests made by other processing systems that may be local to a vehicle's electronic system. For example, a vehicle can include electronics that utilize memory and a processor to execute program instructions to provide services.

In one embodiment, the services provided by the electronic systems of a vehicle can include services that access the various components or subsystems of a vehicle, such as door locks, service histories, user profiles, audio settings, entertainment settings, mapping functions, communications systems, telecommunication synchronization systems, speakers, heating and cooling functions, auto-engine start/shut-off remotely via smart devices, remote heating/cooling initiation, remote face-to-face conferencing, etc. The electronic systems within a vehicle can also provide a user interface, such as a graphical user interface. The graphical user interface can include a plurality of buttons, controls and transceivers to receive input from a user. The input from a user can also be provided by voice input, facial recognition, eye-retina scans, gesture inputs, fingerprint scans, a combination of biometrics, or via a capacitive or regular touchscreen contained or displayed within the vehicle, the vehicle's glass, doors, dashboard etc. The user can also use the vehicle windows to gesture, touch, or communicate with icons or graphics renders on the windows, or augmented reality overlays.

In other embodiments, the electronics of a vehicle can synchronize with a user's portable electronics. The user's electronics can include, for example mobile devices that include smart phones, tablet computers, laptop computers, general-purpose computers, special purpose computers, etc. The various computing devices of the vehicle, and or the computing devices of the user (smart devices) can be connected to the Internet or to each other. Provided that a user has access or account access to the cloud service, the cloud processing services on the Internet can provide additional processing information to the electronics of the vehicle.

In the following embodiments, examples will be provided for ways of having the cloud processing services deliver processing information concerning various physical locations that have mapping data associated there with. The following embodiments will also provide examples of ways a cloud processing service, together with physical sensors, can allow vehicles, structures and objects to become aware of each other, share locations, measurements and mapping data, intended paths and other metrics along with remote administration of the same.

The mapping data associated with the various locations can include locations of objects in the real world. The objects in the real world can include roads, sidewalks, buildings, barriers, fencing, parking structures, walls or obstacles within a location, doors, positioning of walls, location information of other vehicles within a location, sensor data associated with various locations, mapping data that outlines the geometries of a building or vehicle, sensor location that is static and/or dynamic, area and volume information within buildings, structures or areas, sensors for detecting movement or presence of obstacles within a location, data identifying occupancy a specific locations such as a parking structure, a parking space, etc.

In one embodiment, the sensors of a building, showing the outline of the building can provide data of what spaces are available within a designated parking area for example. When a vehicle reaches a building, parking lot, parking designated area of ad-hoc parking lot where auto-park is available, the vehicle will become aware of the availability of non-human operated auto parking and will transfer and receive information to and from the cloud to download and/or access the building's location and map of sensors. When a vehicle reaches a different auto-park location, it will download that particular map.

In one embodiment, vehicles can maintain information regarding where they are, where they are heading and their destination maintained which is maintained by GPS and navigation systems on board. The information collected and maintained by every vehicle is mutually exclusive, meaning that only each individual vehicle is aware of its own heading, rate of speed and current location. This information, on one embodiment is crowd sourced and crowd shared/consumed for use in for accident avoidance. By networking vehicles within a certain radius together, all individually location-aware vehicles become aware of all other vehicles in their sphere of influence. Every vehicle will network with vehicles in their range using wireless communication systems such as but not limited to Wi-Fi, Wi-Gig LTE, cellular, radio, peer-to-peer, near field communication or other methods.

In one embodiment, each vehicle may maintain a table (e.g., in storage, locally on in cloud storage) of all other vehicles in, entering, and or leaving its sphere of influence. The vehicle's cameras can be engaged to take still photos and or video record any incident, whether it results in a successful avoidance or impact. This footage can be used to alert authorities of the severity of the accident and aid insurance companies in identifying fault. A vehicle will maintain a buffer of events for a given amount of time before and after a collision event or collision avoidance event such as the location, speed, heading, and avoidance measures to store and identify the metrics that lead to an incident.

In one embodiment, a personal security system for a vehicle can include a number of features. One feature is electronics in the vehicle that can communicate with sensors of the vehicle and can communicate with the Internet for accessing cloud processing services and storage. The communication system for the vehicle can include, for instance, cellular communication with cell towers, WiFi, WiGig, 802.11ac, 802.11ad and consequent wireless networking standards and technology for communication with wireless routers, peer-to-peer communication with other vehicles or connected computers, near field communication, Bluetooth communication, satellite communication, radio communication, infrared communication, or combinations thereof.

In one embodiment, the communications of the vehicle and electronics of the vehicle will enable direct communication with a user of the vehicle. The user of the vehicle can include, for instance, the owner of the vehicle, a driver of the vehicle, or any third party having access to the vehicle (either to drive the vehicle, to monitor the vehicle remotely, etc.)

As can be appreciated, by providing users with multiple levels of security activation, users can be provided with higher levels of security when approaching a vehicle alone or with small children. Any recordings, images, clips, audio recorded proximate to the vehicle can be shared with others. The sharing can be by way of email, text, application notifications, cloud access to storage holding data, events and data, etc. In one embodiment, the historical data for this user can be saved by the cloud services. In one embodiment, for other registered users of the cloud services, information from all or some of the historical data of events can be saved and used to map out a history of events for selected locations. The locations where events occurred can be mapped out using GPS data and time data.

In one embodiment, users of the service can access an app or cloud service account to determine the historical safety of a particular location or parking slot. This data can also be shared with parking locations, building owners, and others that can take corrective measures to improve security. In one embodiment, the data from historical events triggered at locations can be shared anonymously, without disclosing the identity of the car/user that triggered the alarm. This sharing will encourage others to share the data to collectively improve safety for particular parking areas.

In one embodiment, a vehicle can sense and collect data in its surroundings before a user decides to approach a vehicle. For instance, a vehicle can monitor a proximity volume around the vehicle automatically. In some cases, people will come in contact or in near proximity to the vehicle, but those actions would not be viewed as triggering an alarm. If, however, some activity is determined to be unusual, based on predefined rules, the vehicle can store the activity. If the activity continues (e.g., a person continues to look into the vehicle, is looking under the vehicle, approaches the vehicle too many times over some period of time, etc.), that information can be provided to the user/owner of the vehicle as a notification.

If the user gets this notification, the notification can include video clips or images of the events. By having this information ahead of time, the user can determine whether or not to approach the vehicle at all, and possibly notify the authorities or local security. If the notification simply shows other users getting into and out of their cars beside the user's vehicle, that notifications can be ignored by the user.

In one embodiment, an electric vehicle is defined. The electric vehicle includes a main battery installed in the vehicle; a plug within the vehicle, the plug within the vehicle configured to accept connection of an auxiliary battery, the auxiliary battery providing electric power to the vehicle to supplement electric power from the main battery; automobile logic to control flow of electric power from the main battery and the auxiliary battery, and further having logic to provide Internet access to the vehicle via a wireless connection; a vehicle display disposed within the vehicle, the vehicle display providing information regarding status of charge in the main battery and the auxiliary battery, the vehicle display providing data obtained from cloud services regarding charging stations in proximity to the vehicle when the status of charge indicates that charge level is below a threshold and merchant discounts provided proximate to the charging stations.

In some embodiments, the cloud services provides remote access to a remote computer, the remote computer being provided with data regarding charge status and control of vehicle features from the remote computer.

In some embodiments, the cloud services provide notifications concerning charge status, settings and cost of charging to a remote computing device.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the claims and description.

What is claimed is:

1. A system of a vehicle for charging an electric battery of the vehicle, comprising,
   a battery of the vehicle;
   a controller of the vehicle for interfacing with the battery and controlling an operation of charge transfer to the battery;
   a plurality of coils attached to the vehicle, each coil includes a magnet that is configured to move within said coil, the magnet is caused to move in one or more directions with said coil in response to forces exerted upon the magnet when the vehicle is moving, said magnet moving is configured to generate an electric current that is stored to said battery of the vehicle; and
   a communications interface for enabling wireless communication with a server, the server managing a plurality of user accounts for users.

2. The system of claim 1, wherein said controller is configured to interface with said plurality of coils for monitoring said generation of electric current, said generation of electric current is configured to transfer charge to said battery of the vehicle.

3. The system of claim 1, wherein each magnet of said plurality of coils is configured to move in response to when said vehicle is moving, and said moving of each said magnet produces said electric current by electromagnetic induction.

4. The system of claim 1, wherein the movement of each magnet is caused by accelerations or decelerations of said vehicle.

5. The system of claim 1, wherein said generation of the electric current is by electromagnetic induction.

6. The system of claim 1, wherein said magnet is configured to move back and forth in response to said movement of said vehicle.

7. The system of claim 6, further comprising,
   a rail for allowing said magnet to move back and forth.

8. The system of claim 1, wherein said movement of said magnet is vertical movement or horizontal movement.

9. The system of claim 1, wherein said movement of said magnet is caused by g-forces associated with said movement of said vehicle.

10. The system of claim 1, wherein the server is part of a cloud service that enables access to data and control functions of said vehicle over the Internet, the cloud service includes a database for said plurality of user accounts, each user account configured in association with data regarding a respective electric vehicle and any charge status of the respective electric vehicle.

11. The system of claim 1, wherein said controller is part of automobile electronics integrated with said vehicle, the controller is configured to communicate with vehicle electronics, the vehicle electronics exchanging data with said server to enable remote applications access to information regarding said vehicle, said information including charge state of said battery and charge produced by said plurality of coils and respective magnets in response to said movement, said remote applications include a remote website application, or a smartphone application, or a computer application, or a vehicle application.

12. The system of claim 1, wherein a plurality of coils is built into said vehicle.

13. The system of claim 1, wherein said battery is used to drive a motor of said vehicle.

14. A system of a vehicle for charging an electric battery of the vehicle, comprising,
    a battery of the vehicle;
    a controller of the vehicle for interfacing with the battery and controlling an operation of charge transfer to the battery;
    a plurality of coils attached to the vehicle, each coil includes a magnet that is configured to move within said coil, the magnet is caused to move in one or more directions with said coil in response to forces exerted upon the magnet when the vehicle is moving, said magnet moving is configured to generate an electric current that is stored to said battery of the vehicle, and each magnet of said plurality of coils is configured to move in response to when said vehicle is moving, and said moving of each said magnet produces said electric current by electromagnetic induction; and
    a communications interface for enabling wireless communication with a server, the server managing a plurality of user accounts for users, and the server is part of a cloud service that enables access to data and control functions of said vehicle over the Internet, the cloud service includes a database for said plurality of user accounts, each user account configured in association with data regarding a respective electric vehicle and any charge status of the respective electric vehicle.

15. The system of claim 14, wherein said controller is configured to interface with said plurality of coils for monitoring said generation of electric current, said generation of electric current is configured to transfer charge to said battery of the vehicle.

16. The system of claim 14, wherein said magnet is configured to move back and forth in response to said movement of said vehicle.

17. The system of claim 16, further comprising,
    a rail for allowing said magnet to move back and forth.

18. The system of claim 14, wherein said movement of said magnet is vertical movement or horizontal movement.

19. The system of claim 14, wherein said movement of said magnet is caused by g-forces associated with said movement of said vehicle, the controller is configured to communicate with vehicle electronics, the vehicle electronics exchanging data with said server to enable remote applications access to information regarding said vehicle, said information including charge state of said battery and charge produced by said plurality of coils and respective magnets in response to said movement, said remote applications include a remote website application, or a smartphone application, or a computer application, or a vehicle application.

20. The system of claim 14, wherein a plurality of coils are built into said vehicle.

* * * * *